Sept. 4, 1956     A. D. BENSON ET AL     2,761,570

AUTOMATIC CONVEYOR PICKUP AND DELIVERY SYSTEM

Original Filed July 26, 1946     15 Sheets-Sheet 1

INVENTORS
ALFRED D. BENSON &
EDWARD MULLEN

Sept. 4, 1956  A. D. BENSON ET AL  2,761,570
AUTOMATIC CONVEYOR PICKUP AND DELIVERY SYSTEM
Original Filed July 26, 1946  15 Sheets-Sheet 2

INVENTORS
ALFRED D. BENSON &
EDWARD MULLEN

INVENTORS
ALFRED D. BENSON &
EDWARD MULLEN

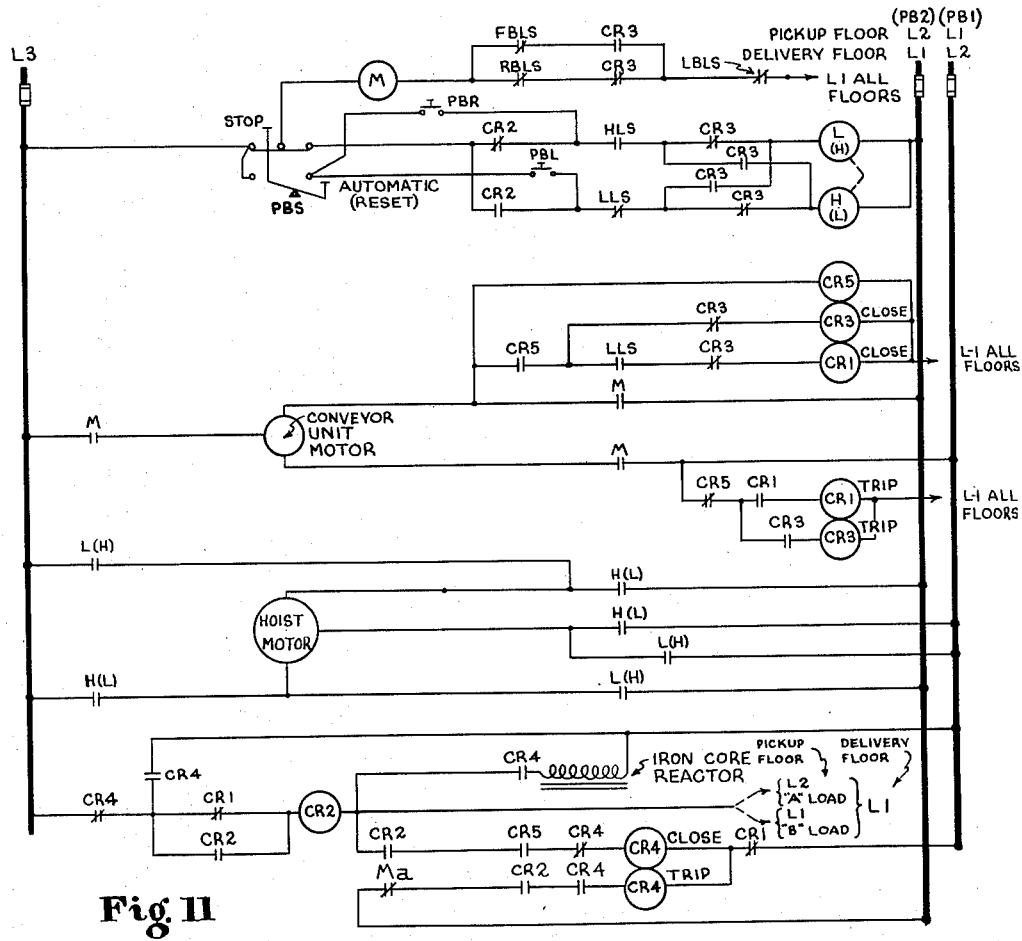
Fig. 11
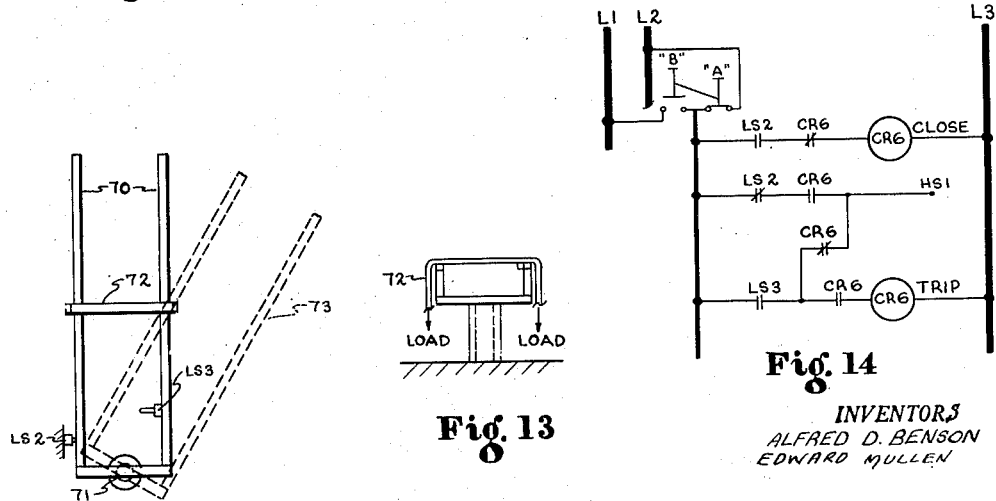
Fig. 12
Fig. 13
Fig. 14

INVENTORS
ALFRED D. BENSON &
EDWARD MULLEN

Sept. 4, 1956  A. D. BENSON ET AL  2,761,570
AUTOMATIC CONVEYOR PICKUP AND DELIVERY SYSTEM
Original Filed July 26, 1946  15 Sheets-Sheet 6
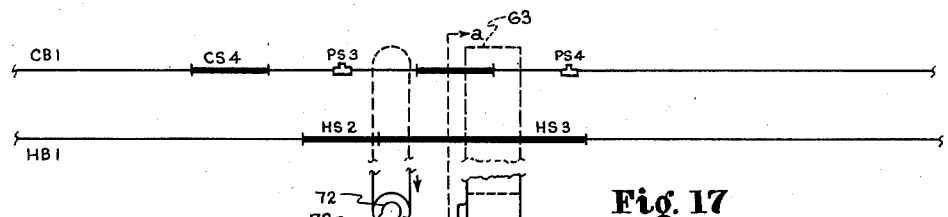
Fig. 17
Fig. 17a
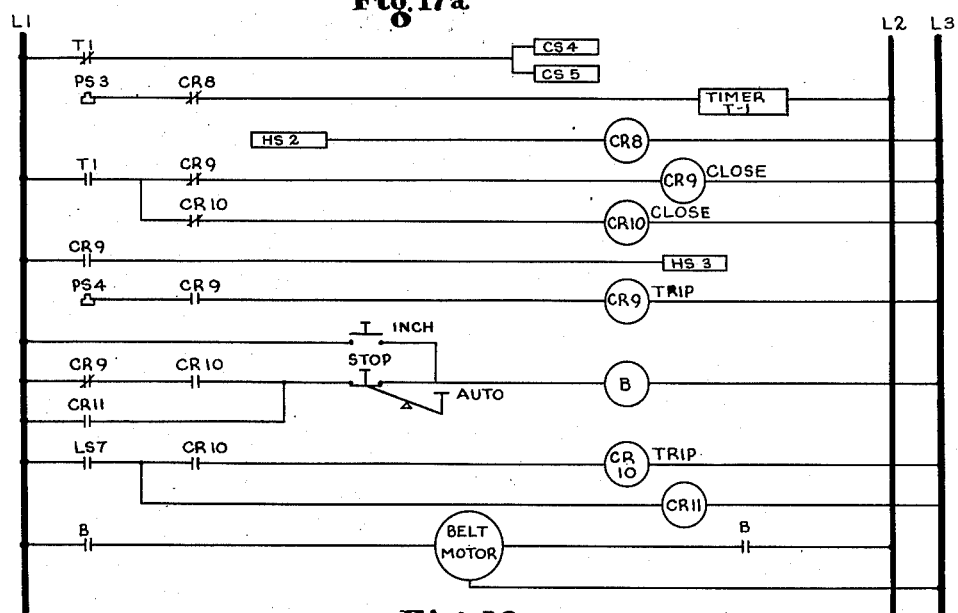
Fig. 18
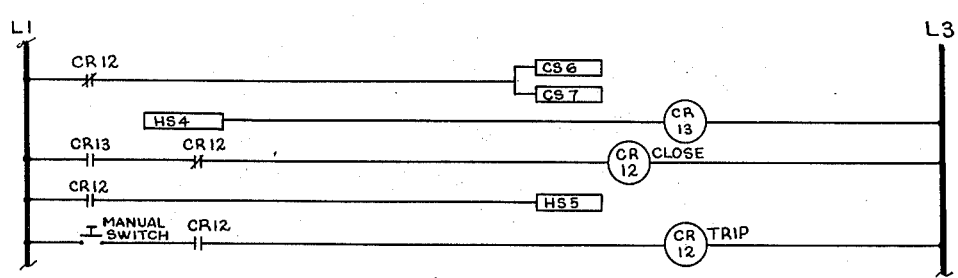
Fig. 20
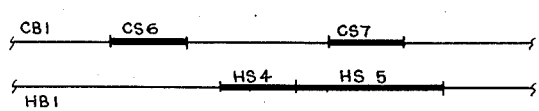
Fig. 19
*INVENTORS*
*ALFRED D. BENSON &*
*EDWARD MULLEN*

INVENTORS
ALFRED D. BENSON &
EDWARD MULLEN

Sept. 4, 1956　　　A. D. BENSON ET AL　　　2,761,570
AUTOMATIC CONVEYOR PICKUP AND DELIVERY SYSTEM
Original Filed July 26, 1946　　　　　　　　　　15 Sheets-Sheet 9

INVENTORS
ALFRED D. BENSON &
EDWARD MULLEN

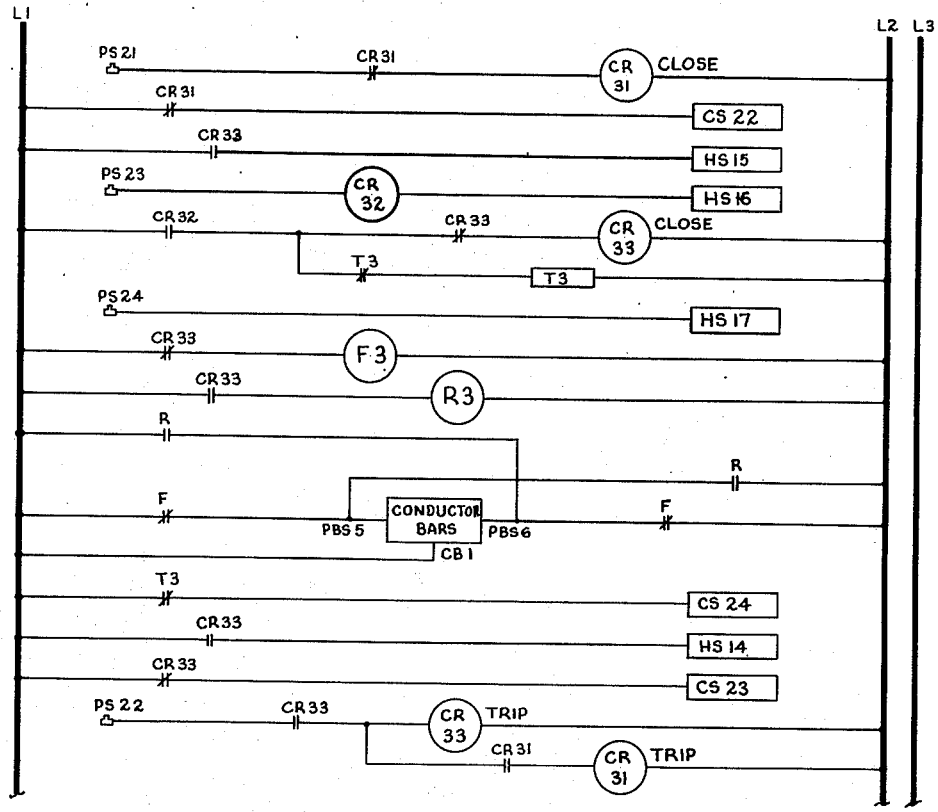
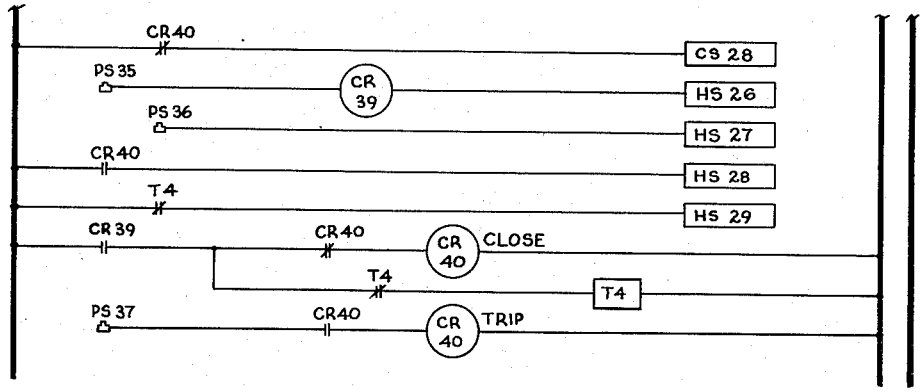
Fig. 32

Sept. 4, 1956   A. D. BENSON ET AL   2,761,570
AUTOMATIC CONVEYOR PICKUP AND DELIVERY SYSTEM
Original Filed July 26, 1946   15 Sheets-Sheet 15

INVENTORS
ALFRED D. BENSON &
EDWARD MULLEN

United States Patent Office 2,761,570
Patented Sept. 4, 1956

2,761,570

AUTOMATIC CONVEYOR PICKUP AND
DELIVERY SYSTEM

Alfred D. Benson, Farmington Township, and
Edward Mullen, Detroit, Mich.

Application January 9, 1956, Serial No. 557,958

51 Claims. (Cl. 212—126)

This invention relates to a conveyor system and more particularly to a system wherein individual identified loads continually deposited at a plurality of pickup points may be automatically picked up, moved to another floor, selectively carried to either of two delivery points, automatically unloaded and moved to a position permitting other loads to be delivered. This invention also relates to a modified system of the general type indicated above wherein the loads picked up on one floor may be selectively delivered to any of a larger number of possible destinations on several floors including the pickup floor.

The present application is a continuation of our prior application Serial No. 686,286, filed on July 26, 1946, for Automatic Conveyor Pickup and Delivery System which is expressly abandoned by the filing hereof.

Industrial material handling systems which have been developed to effect the transportation of individual loads from one work area of a plant to another are generally characterized by the necessity for manual or manually controlled loading and unloading operations. Such necessity frequently presents very serious limitations, especially where the loads are heavy or cumbersome. The advantages incident to a conveyor system of the type indicated above have led to a great number of attempts to provide conveyors which automatically pick up and deliver loads. However, the numerous difficulties which are encountered in combining automatic pickup with selective delivery have, to the best of our knowledge, heretofore prevented the development of a commercially satisfactory automatic pickup and delivery conveyor system of this type.

In general, the means used in the first-mentioned embodiment of this invention (wherein pickup and delivery points are located on two different floors and selection is limited to two delivery points) include individual self-propelled conveyor units; an overhead conveyor track passing over each of the pickup points; an overhead conveyor track passing over each of the delivery points; an elevator joining the exit of the pickup track with the entrance to the delivery track; an independent elevator joining the exit of the delivery track with the entrance to the pickup track; a pickup or hoist mechanism on each conveyor unit capable of lowering to engage a load and of raising to an over-passing position; a separate conveyor to move delivered loads away from the delivery point; a three phase system supplied continuously along each conveyor track as well as in the elevators by two power conductor bars with a grounded third phase; two additional conductor bars for purposes of control and actuation of the hoist mechanism; collector shoes carried by the conveyor units for contacting the power, control and hoist bars; and a control system for causing each of a number of conveyor units to 1. Continuously circulate around both conveyor tracks;
2. Receive an identifying load signal upon approaching a load;
3. Lower its pickup forks;
4. Hold such forks in lowered position while engaging the load;
5. Raise such forks with the load to an over-passing position;
6. Pass over other loads in its path without lowering its forks;
7. Enter an elevator and stop;
8. Move to the delivery floor;
9. Move in reverse direction out of the elevator and onto the delivery track;
10. Proceed in reverse direction to the proper delivery point;
11. Stop and lower the load to unloading position;
12. Proceed in the reverse direction with forks in lowered positions until free of the load;
13. Raise its forks and proceed to the second elevator;
14. Enter such elevator and stop;
15. Move to the pickup floor;
16. Move in forward direction out of the elevator and onto the pickup track;
17. Continue in circulation until another load is approached.

Such control system includes further controls for causing:

1. A load deposited at a pickup point to be identified with respect to its delivery point in a manner which will permit any conveyor unit that may pick up the load to receive a corresponding identifying signal;
2. A conveyor unit, whether traveling in forward or reverse direction, to stop upon approaching another unit;
3. A conveyor unit to stop upon contacting any other obstacle;
4. Each elevator to return to its normal receiving position after a conveyor unit has passed out of it;
5. A conveyor unit to wait for an elevator's return if it is not in receiving position;
6. Movement by separate conveyor means of delivered loads to a position permitting following conveyor units to unload;
7. The approach of a conveyor unit to be stopped while a preceding unit is delivering its load.

In connection with this first embodiment, alternative elevator means are provided to move conveyor units between floors wherein a pair of counterbalanced elevators join the exit of the pickup track with the entrance to the delivery track and an independent pair of counterbalanced elevators join the exit to the delivery track with the entrance to the pickup track, branch tracks being provided leading to and from each of the counterbalanced elevators as well as an alternating track switch for leading an entering conveyor unit to whichever elevator is in receiving position.

In adapting this conveyor system to single floor operation wherein loads are picked up and delivered on the same floor, it would be possible to simulate the means used in the two floor operation by merely substituting a track switch for each elevator. In such case a conveyor unit would pass from the pickup track through a track switch, stop, wait for the switch to move to its delivery track position, move in reverse direction back through the track switch, etc. However, it has been found more desirable to avoid the use of such track switches in single floor operation by providing a continuous endless conveyor track with means for causing the conveyor unit to reverse its direction only during unloading operations. The control system for this latter method causes each conveyor unit to 1. Circulate around the continuous conveyor track in a forward direction;
2. Receive an identifying load signal upon approaching a load;

3. Lower its pickup forks;
4. Hold such forks in lowered position while engaging the load;
5. Raise such forks with the load to an over-passing position;
6. Pass over other loads in its path without lowering its forks;
7. Proceed in forward direction slightly past the proper delivery point;
8. Reverse in direction of travel;
9. Stop and lower the load to unloading position;
10. Move in reverse direction with forks in lowered direction until free of the load;
11. Raise its forks;
12. Stop and proceed in a forward direction over-passing the delivered load;
13. Continue in circulation until another load is approached.

Further controls similar to those described for two floor operation are also provided for causing 1. A load deposited at a pickup point to be identified as to delivery point;
2. A conveyor unit to stop upon approaching another unit;
3. A conveyor unit to stop upon contacting any other obstacle;
4. Movement, by separate conveyor means, of delivered loads to a position permitting following conveyor units to unload;
5. The approach of a conveyor unit to be stopped while a preceding unit is delivering its load.

Where it is desired to adapt the present pickup and delivery system to more than two delivery points, an alternative means for identifying loads and selecting delivery points is provided. Such alternative selective means utilizes an "add and subtract" stepping relay located on each conveyor unit capable of stepping in one direction in response to a series of electrical impulses and in the other direction in response to a different series of electrical impulses. A load to be picked up and delivered to a particular delivery point is identified when placed on a pickup rack by energizing a corresponding number of impulse sections in the hoist conductor bar which actuate the stepping relay of a conveyor unit while it is picking up the load. As the conveyor unit then passes each delivery point, an impulse section causes the stepping relay to take one step back and when the relay has stepped back to a zero position, the conveyor unit automatically stops and unloads.

In order to incorporate selectivity as to delivery floor, a similar stepping relay is utilized which is actuated during the pickup operation by a separate group of impulse sections and is stepped back to zero by a group of impulse sections located at the entrance to the elevator whereupon a signal is established for causing the elevator to move to a corresponding floor. A branch track by-passing the elevators is provided in order to incorporate deliveries on the pickup floor as well as other floors and also to permit unloaded conveyor units to circulate on the pickup floor without moving to other floors.

In accordance with the above general description, it is the principal object of the present invention to provide a conveyor system wherein individual identified loads continually deposited at a plurality of pickup points may be automatically picked up, moved to another floor, selectively carried to either of two delivery points, automatically unloaded and moved to a position permitting other loads to be delivered.

Another object is to provide a modified conveyor system wherein delivery points are located on the same floor as the pickup points.

A further object of the invention is to provide a modified conveyor system wherein identified loads may be delivered to a larger number of possible destinations on several floors including the pickup floor.

Another object is to provide individual self-propelled conveyor units with a pickup mechanism capable of being lowered to a pickup position and raised to an over-passing position.

A further object is to provide automatic elevator means for joining pickup and delivery conveyor tracks.

Another object is to provide supplementary conveyor means for automatically moving loads after their delivery to a non-blocking position.

A further object is to provide a power supply system adaptable to meet the requirements of the present invention.

Another object is to provide a control system for accomplishing each of the steps indicated above.

These and further objects will appear more clearly from the following detailed description of the particular embodiments of the present invention and by reference to the drawings forming a part hereof and wherein, Fig. 1 is a schematic plan view of a conveyor layout on two floors with elevators joining the tracks on each floor in accordance with the first embodiment of the present invention.

Fig. 11 is a schematic diagram of the control circuit located in each self-propelled conveyor unit.

Fig. 12 is a schematic plan view of a loading rack used at the various pickup points.

Fig. 13 is an end elevation of the rack shown in Fig. 12.

Fig. 14 is a schematic diagram of the control circuit at each pickup point.

Fig. 17 is an enlarged schematic view of the automatic delivery point shown in Fig. 1 including the belt conveyor used at such delivery point.

Fig. 17a is a fragmentary side elevation of the belt conveyor taken along the line a—a of Fig. 17.

Fig. 18 is a schematic diagram of the control circuit for such automatic delivery point.

Fig. 19 is an enlarged schematic view of the semi-automatic delivery point shown in Fig. 1.

Fig. 20 is a schematic diagram of the control circuit for such semi-automatic delivery point.

Fig. 32 is a schematic diagram of the control circuit for a typical delivery point on the pickup floor as well as a typical delivery point on one of the delivery floors.

Fig. 34 is a schematic plan view of the return elevator used in the multiple floor system including conveyor lines leading to and from and by-passing such elevator.

CONVEYOR TRACK AND ELEVATOR LAYOUT

Figure 1:
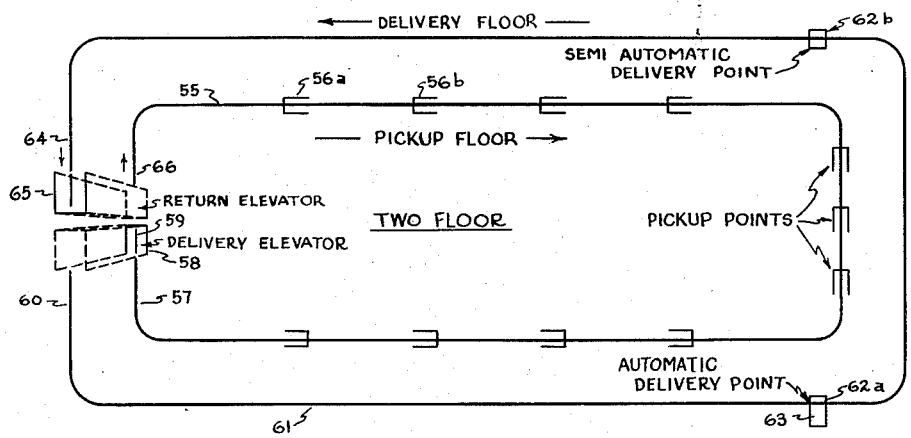

Referring to Fig. 1 showing a layout of the conveyor track in accordance with the first embodiment of the present invention, it will be seen that a single track 55 passes over each of the pickup points 56a, 56b, etc. and that the exit 57 of the pickup track leads to an elevator 58 which is provided with a section of track 59 suspended from the top of the elevator which may be brought into alignment with the exit 57 of the pickup track 55. Movement of the elevator 58 to the delivery floor brings the section of the track 59 within the elevator into alignment with the entrance 60 to the delivery track 61. It will be noted that the entrance 60 to the delivery track joins the elevator 58 on the same side as the exit 57 of the pickup track so that a conveyor unit entering the elevator 58 in a forward direction will leave such elevator in a reverse direction as it enters the delivery track 61.

The delivery track 61 passes over two delivery points 62a and 62b. The delivery point 62a has been chosen to illustrate an automatic unloading operation incorporated in the present conveyor system and includes an automatic belt conveyor 63 for moving delivered loads to the side of the conveyor track as fast as they may be delivered in order to make way for each subsequent load. The delivery point 62b, which might if desired also incorporate the automatic unloading features, has been chosen in this case to illustrate an alternative method of delivery wherein the conveyor unit will stop and lower the load awaiting manual or manually controlled removal of the load and restarting of the conveyor unit. Thus, for this delivery point, no automatic conveyor such as the belt conveyor 63 is used. The exit 64 of the delivery conveyor track 61 leads into a second elevator 65 similar in operation to elevator 58 which, upon movement to the pickup floor, joins the entrance 66 to the pickup track 55.

Figure 2:
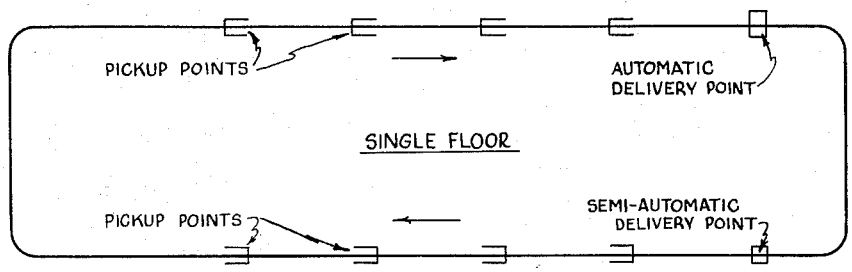
Fig. 2 is a schematic plan view of a modified conveyor layout for single floor pickup and delivery operation.
Figure 3:
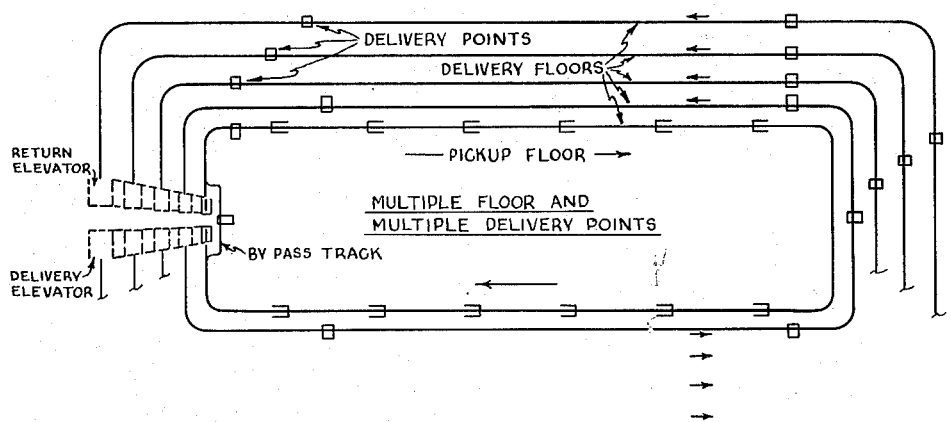
Fig. 3 is a schematic plan view of a modified multiple floor conveyor layout with elevators joining the tracks on each floor and with multiple delivery points located on each floor including the pickup floor.
Figure 5:
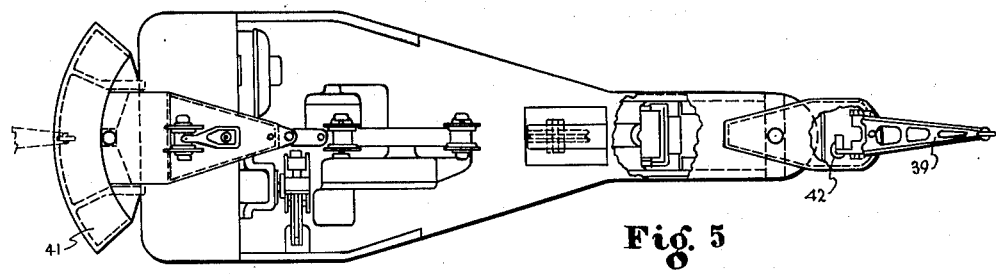
Fig. 5 is a plan view of the conveyor unit shown in Fig. 4 omitting the conveyor track and certain of the trolleys.

The conveyor layouts shown in Figs. 2 and 3 illustrate the modified conveyor systems incorporating single floor pickup and delivery and multiple floor-multiple delivery point operations, respectively, and will be more fully explained in connection with such modified systems.

SELF-PROPELLED CONVEYOR UNIT

Referring to Figs. 4 to 9 inclusive, it will be seen that the conveyor unit comprises generally a traction wheel and driving motor assembly designated as A, a supporting framework B for mounting a hoist motor and reduction gearing therefor, a forwardly extending fixed framework C and a movable pickup mechanism D.

The driving wheel 10 is rotatably journaled in the framework 11 and held in compression against the lower surface 12 of the conveyor track 13 by the vertical spacing effected by the trolley brackets 14 between trolley wheels 15 journaled thereto to roll upon the upper surface 16 of the conveyor track 13 and the framework 11 suspended from the trolley brackets 14. A three phase motor 17 mounted on the framework 11 and suitably geared to the driving wheel 10 by means not shown rotates the driving wheel 10 in either a forward or reverse direction in a manner hereinafter described more fully.

The driving assembly A through a drawbar 18 imparts motion to the rear trolley assembly 19 suspended from the conveyor track by the trolley wheels 20 and trolley brackets 21. The framework B is suspended from the trolley assembly 19 by a bolt 22 and mounts a hoist motor 23, reduction gearing 24, a cable drum 25 and a cable pulley 26, as most clearly shown in Figs. 7 and 8.

Bracket members 27 attached to the lower end of the framework B serve to pivotally attach extension arms 28 of the pickup mechanism D which are in turn pivotally attached at their outer ends 29 to a pickup fork 30 which, in the present embodiment, serves to engage and support the load to be conveyed. A cable 31 atttached to the cable drum 25 passes around the cable pulley 26 and a second pulley 32 suitably journaled at the upper end of the supporting framework C. From the cable pulley 32 the cable 31 passes around a sheave 33 and is securely attached, as shown at 34, to the outer end 35 of the upper extension arm 28.

It will thus be seen that when the hoist motor 23 is run in a direction such as to unwind the cable 31, the weight of the pickup mechanism D will cause it to be lowered to its pickup position, as shown in phantom outline, and that when the hoist motor 23 is run in the opposite direction winding the cable 31 on the drum 25, the pickup mechanism will be raised to its upper position. It will be noted that the parallel construction of the extension arms 28 will cause the fork 30 to remain in a horizontal position at all times.

The position of the pulley 32 on the supporting member C, which is in turn supported at its forward end by the trolley assembly 36 through bracket members 37 and trolley wheels 38 causes the weight of the load supported by the fork 30 to be distributed between the forward trolley assembly 36 and rear trolley assembly 19.

A forward bumper arm 39 is pivotally connected to a bracket 40 which is in turn mounted on the forward trolley assembly 36 and is positioned to contact the fan-shaped rearward bumper member 41 of an adjacent conveyor unit on approaching such unit from the rear. Such contact raising the forward bumper arm serves to depress a forward bumper limit switch FBLS opening an electrical contact which, when the conveyor unit is traveling in a forward direction, stops the driving motor 17 thereby stopping the conveyor unit. At the same time the rear bumper 41 which is pivotally attached at 43 to the rearward trolley assembly 19 moves downward depressing a rear limit switch RBLS thereby opening another electrical contact. As will be hereinafter more clearly described, these contacts are so arranged in the conveyor unit control circuit so as to cause only the driving motor of the overtaking conveyor unit to be stopped, whether such overtaking conveyor unit is traveling in a forward or reverse direction.

A solenoid brake adapted to quickly stop the driving motor upon any interruption in its energizing circuit operates to stop the conveyor unit in a relatively short space so as to prevent any damage to either conveyor unit in the event that one overtakes the other. In this connection, the forward bumper arm 39 upon contacting the rearward bumper 41 is free to ride up the inclined surface 50 and to thereupon slide over such bumper in a manner which permits the approaching conveyor unit to move a substantial distance toward the other conveyor unit after the initial depression of the respective limit switches, such distance exceeding the required stopping distance for a conveyor unit traveling at full speed.

A lower bumper ring 45 is suspended from the framework B by bolts 46 and 47 in a manner whereby contact with an obstacle in the path of the conveyor unit from any side will move the ring 45 laterally and upwards causing a cup-shaped member 48 centrally attached within the ring 45 to depress a lower bumper limit switch LBLS and thereby stop the driving motor 17.

Figure 8:
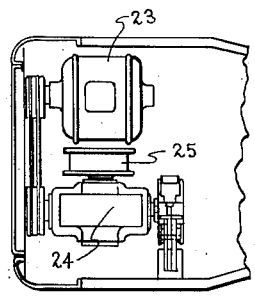
Fig. 8 is a fragmentary view taken along the line 8—8 of Fig. 4.
Figure 9:
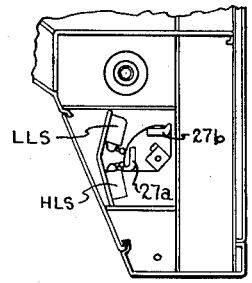
Fig. 9 is a fragmentary view taken along the line 9—9 of Fig. 6.

As shown in Figs. 8 and 9, a hoist limit switch HLS and a lower limit switch LLS mounted on the framework B are actuated respectively by the movement of the hoist mechanism D to its upper and lower positions through the contact of dogs 27a, 27b mounted on plate 27c to rotate with the hub of extension members 28.

POWER SUPPLY

Figure 10:
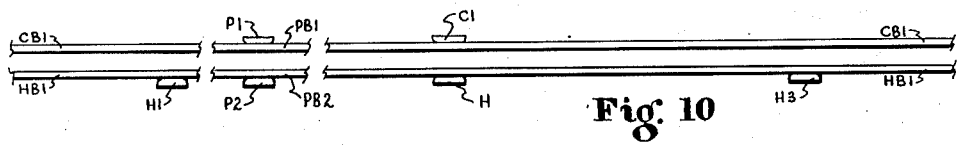
Fig. 10 is a fragmentary view taken along the line 10—10 of Fig. 4.
Figure 4:
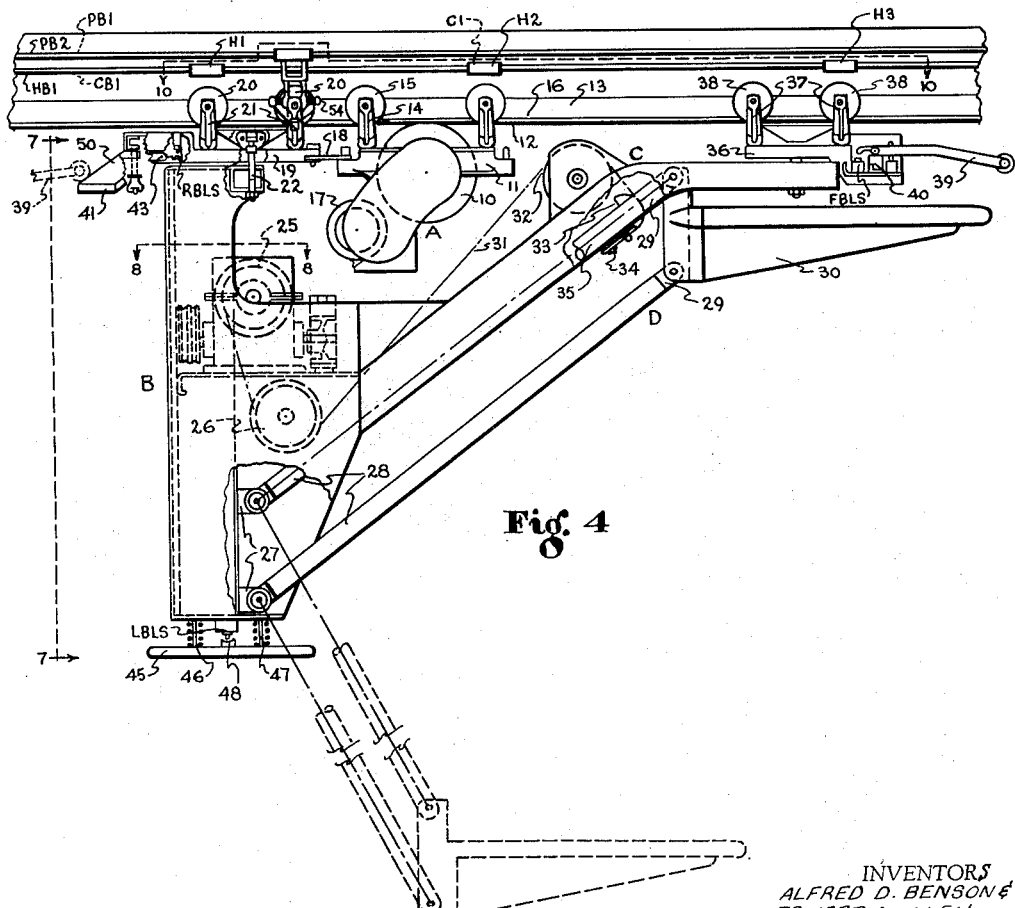
Fig. 4 is a side elevation of a conveyor unit shown in assembled position on the conveyor track including the pickup mechanism mounted thereon.
Figure 6A:
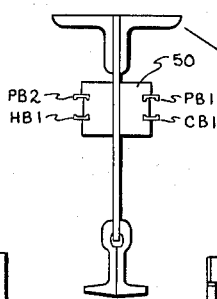
Fig. 6a is an enlarged end view of the conveyor track and conductor bars shown in Fig. 6.
Figure 7:
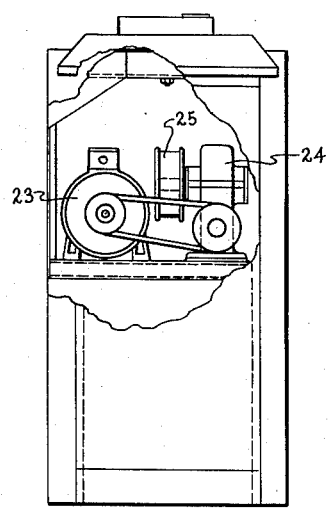
Fig. 7 is a fragmentary view taken along the line 7—7 of Fig. 4.
Figure 6:
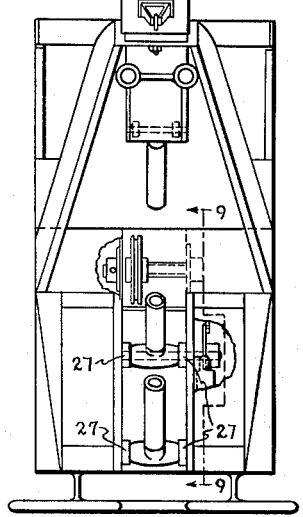
Fig. 6 is an end elevation of the conveyor unit shown in Fig. 4.

As shown in Figs. 4, 6 and 10, power conductor bars PB1, PB2 mounted in insulator blocks 50 are contacted by power collector shoes P1, P2 which are suitably mounted on the conveyor bracket as shown at 54 and urged by spring means to contact such conductor bars. A control conductor bar CB1 and a hoist conductor bar HB1 are also contacted respectively by a control shoe C1 and hoist shoe H1. The additional hoist shoes H2 and H3, which are used only in connection with the modified multiple floor-multiple delivery point system, likewise contact the hoist conductor bar HB1.

A three phase power supply is carried continuously along the conveyor track 13 by the power conductor bars PB1 and PB2, the third phase being grounded through the main body of the conveyor track. Power phases L1 and L2 are carried by the conductor bars PB1 and PB2 respectively on the pickup floor, as well as in the elevator 58 during its movement to the delivery floor. Reverse phases L2 and L1 are carried by the corresponding conductor bars PB1, PB2 on the delivery floor at all times and in the elevator 58 as soon as it reaches delivery floor level. The control conductor bar CB1 is normally energized thrugh direct connection to the power bar PB1 on the pickup floor and PB2 on the delivery floor so that it is supplied with power phase L1 on both floors. Such conductor bar is provided with insulated control sections to be hereinafter more fully described. The conductor bar H1 is not directly energized by either of the power bars but is used in completing certain signal circuits to actuate the hoist mechanism of the self-propelled conveyor unit in a manner hereinafter described.

CONTROL SYSTEM

The control system used in the first embodiment of the present conveyor system may be divided into several parts including those respectively located in the self-propelled conveyor unit, at each pickup point, at each elevator, and at the delivery points. The control circuits located at these various points are primarily directed to control the operation of the various motors which are provided to drive the conveyor units, to operate the hoist mechanism on each conveyor unit, to operate each elevator, and to operate the belt conveyor located at the automatic delivery point. The components of the various control circuits include standard commercially available latching relays which are closed and tripped by separate circuits and are provided with both normally open and normally closed contacts reversed upon the closing of the relays; spring return relays having contacts reversed when the relay is energized and returned to normal position upon the opening of the energizing circuit; magnetic line contactors which operate when energized to close circuits from the power supply to the various motors; reversing line contactors for the elevator motors permitting them to be run in a forward or reverse direction by reversing the phase connections; limit switches which operate through physical contact to open normally closed and close normally open contacts; timers which are electrically energized and serve to reverse normal contacts for a predetermined period of time and then return such contacts to their normal position; and push button stations provided for manual control. These control circuits also include certain insulated sections in the control and hoist conductor bars CB1 and HB1 which are energized and de-energized for control purposes; "pulse" sections in the control conductor bar CB1 which are momentarily energized when contacted by the pickup shoe of a conveyor unit; and iron core reactors having an impedance sufficiently high to prevent a short circuit white permitting passage of sufficient current to energize a control relay. As previously indicated, each conveyor unit is provided with pickup shoes P1, P2, C1, and H1 for continuously contacting the power conductor bars PB1 and PB2, the control conductor bar CB1 and the hoist conductor bar HB1 (see Fig. 4).

a. Conveyor unit

Referring to Fig. 11 which shows a schematic diagram of that portion of the control circuit located within each conveyor unit, the vertical line designated as L3 represents the grounded third phase of the power supply and the other vertical lines represents the power phases carried by the conductor bars PB2 and PB1. Connections to the latter two lines represent electrical contacts made directly through the power pickup shoes P2 and P1. Arrows designated as "L1 all floors" indicate electrical contacts established through the pickup shoe C1 contacting the control conductor bar CB1. The divided dotted arrows designated L2 and L1 at the bottom of the diagram indicate contacts made by the pickup shoe H1 with insulated sections of the hoist conductor bar HB1 at pickup and delivery points.

All control circuits in the conveyor unit itself are directed to control the operation of the conveyor unit motor and the hoist motor. These three phase motors are each supplied with power directly from the power pickup shoes P1 and P2.

The starting and stopping of the conveyor unit motor is controlled by the contacts M of a magnetic line contactor which are closed when the coil encircled M of such contactor is energized. Directional control of the conveyor unit motor is accomplished solely through the phase relationship of the power carried in conductor bars PB1 and PB2. The conveyor unit motor which is normally driving the conveyor unit is stopped whenever the control shoe C1 contacts a de-energized section in the conductor bar CB1, the lower bumper limit switch is depressed, the forward or rear bumper limit switch FBLS or RBLS is depressed, depending on the direction of travel, or the stop push button of the push button station PBS is depressed.

The operation of the hoist motor in one direction or the other is controlled by the contacts L(H) and H(L) of a reversing line contactor which are closed respectively when the coil encircled L(H) or H(L) is energized. During automatic operation, the energizing circuits for either of these coils must pass through one of two contacts of a spring return relay CR2, the upper or lower limit switch HLS or LLS, and one of four contacts of a mechanically held relay CR3. The condition of the contacts of these relays is in turn controlled by certain additional control relays including mechanically held relays CR1 and CR4 as well as a spring return relay CR5.

More specifically, the condition of the circuit represented by the schematic diagram, as shown conforms to that of a conveyor unit with its hoist mechanism in raised position before energizing the power conductor bars. Assuming the conveyor unit to be on the pickup floor, upon energizing the power conductor bars PB1 and PB2, a circuit from L3 to L1 through the contacts of the push button station PBS, which is shown depressed to automatic position, the energizing coil of the magnetic line contactor encircled "M," the normally closed contact of the reverse upper limit switch RBLS, the normally closed contact of control relay CR3, and the normally closed contact of the lower bumper limit switch LBLS energizes the magnetic line contactor thereupon closing the contacts M and starting the conveyor unit motor in a forward direction. With the M contacts closed, a circuit from L2 to L1 through the energizing coil encircled CR5 of control relay CR5 is established reversing the normal contacts of such relay and thereupon a circuit from L2 to L1 through the normally opened contact of control relay CR5, the normally closed contact of control relay CR3 and the closing coil of control relay CR3 energizes such closing coil reversing all CR3 contacts. The reversal of the CR3 contacts in series with the forward and rear bumper limit switch contacts FBLS and RBLS causes the circuit to the line contactor for the conveyor unit motor to now pass through the forward bumper limit switch FBLS so that a physical contact made by the forward bumper of the conveyor unit will open the circuit to such line starter thereby stopping the conveyor unit, while a contact with the rear bumper opening the normally closed contact RBLS will not interrupt such circuit. It will be noted that a contact with the bumper ring 45, as shown in Fig. 4, will open the LBLS contact in this circuit thereby interrupting the power to the conveyor unit motor.

The closing of control relay CR3 also reverses the CR3 contacts in series with the energizing coils of the reversing line contactor encircled L(H) and H(L). The upper energizing coil as shown in the diagram, which controls the contacts L(H) in series with the hoist motor and on the pickup floor, when energized, causes such hoist motor to operate in a direction lowering the hoist mechanism. The lower energizing coil which controls the contacts H(L) when energized, causes the hoist motor to operate in a reverse direction raising the hoist mechanism. This results from the reverse application of two phases to the hoist motor when the H(L) contacts are closed. Thus, with the pickup mechanism in its raised position and with the control relay CR3 closed reversing its normal contacts, it is necessary, in order to lower the pickup mechanism, to establish a circuit from L3 to L2 through the normally open contact of control relay CR2, the normally open contact of the lower limit switch LLS, the normally open contact of control relay CR3 and the energizing coil encircled L(H). Since the normally open CR3 contact is now closed, it remains for control relay CR2 to be energized in order to start the hoist motor to lower the hoist mechanism. In point of time, it is desirable for such lowering of the hoist mechanism to take place while the conveyor unit is approaching a load, remain in lowered position while engaging the load, and raise to its upper position after such load is engaged. In terms of the control circuit this means that control relay CR2 should be energized upon the approach of the conveyor unit to a load, remain energized for a short period after the downward movement of the pickup mechanism is stopped by the opening of the normally closed contact in the lower limit switch LLS and should be de-energized after the load has been engaged permitting a circuit to be established through the normally closed contact of control relay CR2, the normally open contact of the upper hoist limit switch HLS (which closes upon the lowering of the hoist), the normally open contact of control relay CR3 and the line contactor energizing coil encircled H(L). This time actuation of control relay CR2 is accomplished through a section of the hoist conductor rail HB1 extending from a point somewhat preceding each loading point to a point past such loading point. Such section, which may be energized with either L1 or L2 phase in a manner presently to be described, when contacted by the hoist pickup shoe H1 of the conveyor unit, establishes a circuit from L3 to L2 or L1, as the case may be, through the normally closed contact of control relay CR4, the normally closed contact of control relay CR1, and the energizing coil of control relay CR2.

Since the control relay CR2 is energized through the initial contact of the conveyor unit pickup shoe H1 with an energized section of the hoist conductor bar HB1, the hoist motor is energized in a lowering direction and continues to lower the pickup mechanism until the lower limit switch LLS contact is opened. When the load has been engaged and the pickup shoe H1 passes off of such energized section of the hoist conductor bar H1, or such section becomes de-energized, control relay CR2 returns to its de-energized position thereupon closing a circuit through the normally closed contact of control relay CR2, the normally open contact of the upper hoist limit switch HLS, the normally open contact of control relay CR3 and the line contactor energizing coil encircled H(L) thereupon starting the hoist motor in a raising direction. When the hoist reaches its upper position, the upper hoist limit switch HLS is depressed thereupon opening the HLS contact and stopping the hoist motor.

In order to prevent the subsequent lowering of the pickup mechanism upon approaching a second load, it is necessary to prevent a circuit from again energizing control relay CR2 until after the first load has been delivered. This is accomplished by control relay CR1 which is closed by a circuit from L2 to L1 through a normally open contact of control relay CR5, a normally open contact of the lower limit switch LLS, a normally closed contact of control relay CR1 and the closing coil of control relay CR1. As soon as the lower limit switch LLS is depressed, upon the lowering of the pickup mechanism to engage a load, closing the normally open contact of such switch in series with the closing coil of control relay CR1, such relay is closed. The reversal of CR1 contacts opens the normally closed contact of such relay in series with the energizing coil of control relay CR2 and, once control relay CR2 has become de-energized after the first load has been engaged, the subsequent closing of its energizing circuit upon the conveyor unit's approach to another load is thereby prevented. However a circuit for maintaining control relay CR2 in an energized condition as long as the hoist shoe H1 remains in contact with an energized section in the hoist conductor bar is established through the now closed CR2 contact circuit in parallel with that passing through the now open CR1 contact.

Identification of the load as between the two delivery points is accomplished by control relay CR4 which is closed when the energized section of the hoist conductor bar at the pickup point is energized with current of L2 phase but remains unclosed when such section is energized with current of the L1 phase. It will be noted that the circuit from L3 through the energizing coil of control relay CR2 is effective to close control relay CR2, regardless of which phase of current is used to energize the hoist conductor bar. The resistance of the energizing coil for control relay CR2 is too high to permit a circuit from L3 to close control relay CR4 so that the only available circuit for closing such relay is from the energized hoist conductor bar. If such conductor bar is energized with the L2 phase, a circuit from such conductor bar through the closing coil of control relay CR4 to L1 is established closing control relay CR4 as soon as the normally open contact of control relay CR2 in series with such circuit is closed. If the hoist conductor bar is energized with a current of L1 phase, each side of the closing coil of control relay CR4 is supplied with current of L1 phase so that no energizing circuit is established. As soon as control relay CR4 is closed reversing the contacts of such relay, the energizing circuit for control relay CR2 from L3 is opened by the opening of the normally closed CR4 contact in such circuit. However, a circuit for maintaining control relay CR2 in a closed position as long as the energized section of the hoist conductor bar is contacted by the pickup shoe is maintained upon the closing of control relay CR4 by a circuit from L1 to L2 through the normally open contact of control relay CR4 which becomes closed.

Thus, if an "A" load represented by the L2 phase in the energized section of the hoist conductor bar is picked up, control relay CR4 is closed, whereas, if a "B" load represented by an L1 phase in the hoist conductor bar is picked up, control relay CR4 is not closed. This manner of identifying the load at the moment it is picked up is utilized to determine the proper corresponding delivery point in a manner presently to be described. Regardless of whether an "A" or "B" load is picked up, the closing of control relay CR1 prevents any subsequent energized section of the hoist conductor bar from causing the pickup mechanism to lower.

The closing of control relay CR4 closes the normally open contact of such relay in series with the iron core reactor thus establishing a circuit from L1 through such iron core reactor to L2 in the energized section of the hoist conductor bar as long as such section is contacted by the pickup shoe of the conveyor unit. The impedance of the iron core reactor is sufficiently high to prevent such circuit from constituting an overload to the power supply in the absence of any other resistance in the circuit. Such circuit serves no function on the pickup floor, but as will be hereinafter explained, sufficient current is passed by a circuit through the iron core reactor to energize a relay used in effecting the selection of the proper delivery point.

b. Pickup point

The control circuit located at each pickup point operating in combination with the conveyor unit control circuit described above must include a means for energizing an insulated section in the hoist conductor bar HB1 when a load has been deposited at the pickup point, a means for identifying the load by energizing such section in the hoist conductor bar HB1 with either L1 or L2 phase, and a means for preventing conveyor units from receiving a pickup signal during the time after a load has been picked up and before another load has been deposited at the pickup point. These requirements are met in the present case by a loading rack (see Figs. 12 and 13) and control circuit therefor as shown in Fig. 14. The loading rack comprises a pair of bars 70 swivelly mounted on a perpendicular axis 71 below the conveyor track. The spacing and height of the bars 70 are such that when brought into alignment with the track, the lowered forks 30 of a conveyor unit will pass between and below the upper surface of the bars 70 to engage a load 72 deposited on the bars without stopping.

In placing a load on the bars, they are first manually swung to a position such as the dotted line position 73 where they will extend under a craneway or other suitable loading device. After the load has been placed on the bars, they are manually swung back into alignment with the track.

A limit switch LS2 is actuated by the movement of the bars between loading and pickup positions and a limit switch LS3 is depressed by the lowered forks 30 of a passing conveyor unit. A push button switch, as schematically shown in Fig. 14, is placed in a convenient position and may be depressed to either "A" or "B" positions corresponding to the delivery point desired.

The control circuit at each pickup point, as shown in Fig. 14, includes a mechanically held two position relay CR6 which, together with the limit switches LS3 and LS2, control the energizing circuit to the insulated section HS1 of conductor bar HB1 which extends from a point sufficiently in advance of the loading rack to permit the forks 30 of a conveyor unit to be completely lowered before passing between its bars to a point somewhat beyond that at which it is desirable for the forks of a conveyor unit picking up a load to raise.

The circuit is shown in a condition corresponding to that of an unloaded rack in alignment with the track, the push button being depressed to an "L2 phase" position representing an "A" load. Section HS1 of the hoist conductor bar is de-energized due to the open contacts of control relay CR6 and limit switch LS3 in the parallel energizing circuits for such section. Therefore, unloaded as well as loaded conveyor units will pass over the rack without receiving a signal causing them to lower their forks. When the rack is moved to loading position, the limit switch LS2 contacts are reversed completing the circuit to the closing coil of control relay CR6, thereby reversing the three contacts of such relay. Section HS1 in the hoist conductor bar HB1 remains de-energized until the bars 70 of the rack are swung back into aligned position with the conveyor track due to the open limit switch LS2 contact. With the loaded rack in pickup position, section HS1 becomes energized by a circuit through the then closed contacts of limit switch LS2 and control relay CR6, thereby causing the first approaching unloaded conveyor unit to lower its forks in the manner previously described.

As the forks 30 of such conveyor unit pass between the bars 70 of the loading rack, they contact limit switch LS3 depressing such switch during the period while such forks are passing. It will be seen by referring to Fig. 14 that the initial depression of limit switch LS3 closes a circuit to the tripping coil of control relay CR6 returning the four contacts of such relay to their normal position as shown in Fig. 14. This opens the energizing circuit to section HS1 in the hoist conductor bar HB1 which passes through the LS2 contact. However, as long as limit switch LS3 remains depressed, section HS1 will remain energized through the energizing circuit passing through the LS3 contact.

Thus, the point at which the conveyor unit forks 30 will begin to rise after engaging a load, which corresponds to the de-energizing of section HS1, is made a function of the relative longitudinal position of the pickup forks 30 within the bars 70 of the loading rack. In this manner, extremely accurately timed pickup operation may be effected so that the load can be actually "lifted" off of the rack without sliding it along the bars 70.

The portion of the pickup forks 30 which will first contact the load will largely depend upon the type of load involved. In some cases it may be desirable to have the load first engaged by the forward end of the pickup forks giving it an opportunity to slide back on such forks as the velocity of the conveyor unit is gradually imparted to the load through the frictional contact therebetween. In other cases it may be desirable to have the load simultaneously engaged by the horizontal lifting surfaces and the vertical backup surface of the pickup forks 30 (see Fig. 4).

As soon as that portion of the pickup forks which contacts limit switch LS3 has passed such switch, section HS1 of the hoist conductor bar becomes de-energized and remains so until the rack is again loaded and moved to pickup position.

The circuit at the pickup point operates in an identical manner when the push button "B" is depressed to a position for energizing section HS1 with L1 phase corresponding to a "B" load.

c. Elevator

If no load is encountered by a conveyor unit during its travel around the pickup floor, it proceeds to the exit 57 of the pickup track (see Fig. 1). In the same manner a conveyor unit, after picking up a load and passing over any subsequent loads in its path, proceeds to the exit of the pickup track. The operation of the elevator 58 in moving a conveyor unit from the pickup to the delivery track is identical regardless of whether the conveyor unit approaches with or without a load.

Figure 15:
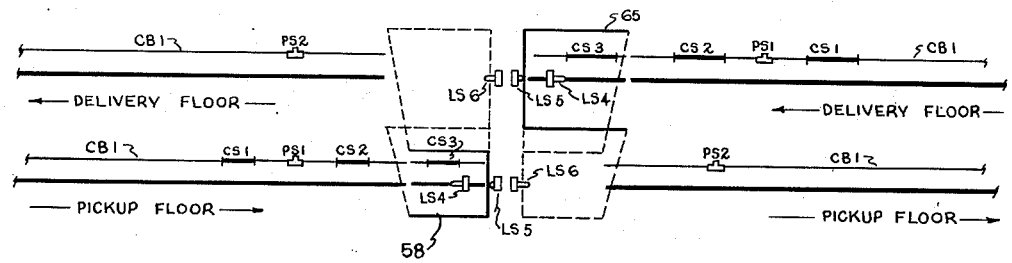
Fig. 15 is an enlarged schematic view of the elevators shown in Fig. 1.

Referring to Fig. 15 showing the elevator 58 in its normal receiving position, the conveyor unit enters the elevator after the pickup shoe C1 of the conveyor unit in contact with the control conductor bar CB1 passes over control section CS1, pulse section PS1 and control section CS2. When the conveyor unit enters the elevator 58, its control shoe C1 contacts a control section CS3 in the elevator control conductor bar CB1 and the forward trolley wheel of the conveyor unit depresses a limit switch LS4. The limit switch LS5 at the pick-up level of the elevator shaft is depressed by the elevator itself as is the limit switch LS6 located at the delivery level of the elevator shaft.

Figure 16:
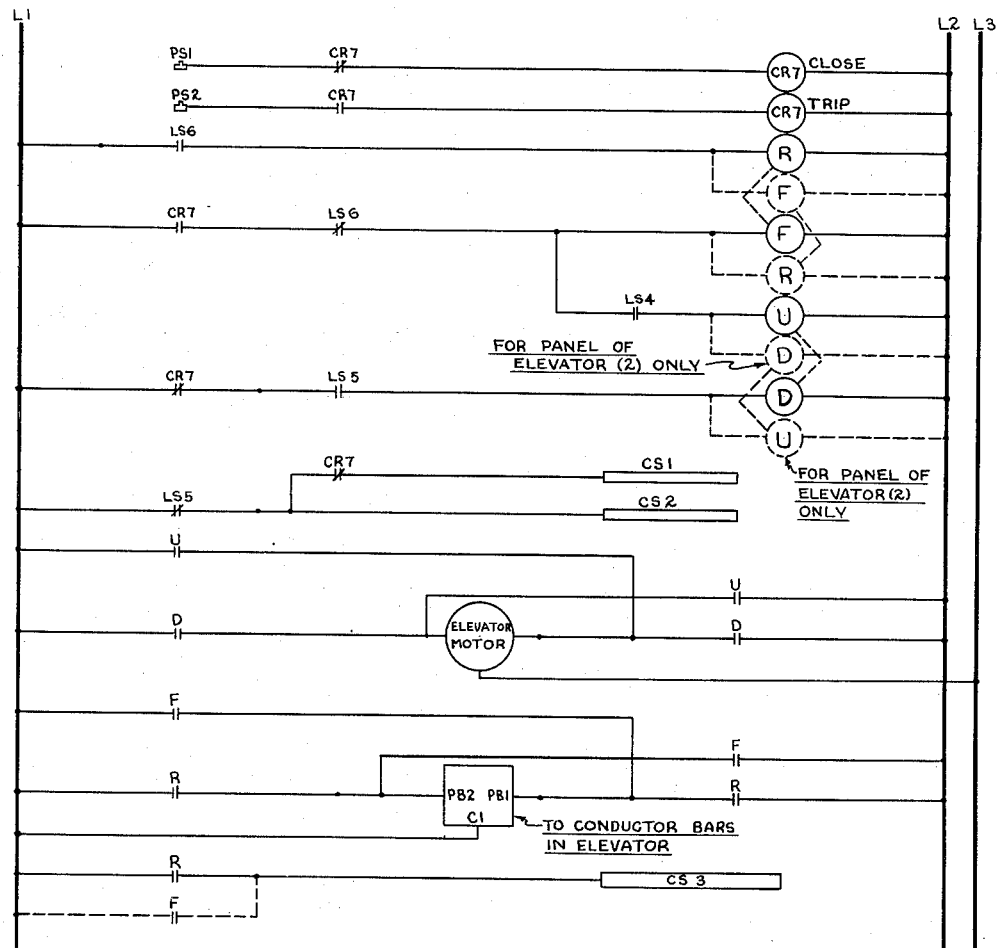
Fig. 16 is a schematic diagram of the control circuit for each of the elevators.

Referring to the schematic diagram shown in Fig. 16 for that portion of the control circuit located at each elevator, it is seen that the control sections CS1 and CS2 are normally energized by a circuit passing through the closed contacts in limit switch LS5 and control relay CR7. As the pickup shoe in the conveyor unit passes over pulse section PS1, a circuit from L1 to L2 through the closing coil of control relay CR7 is established closing such relay and reversing its contacts, thereupon opening the normally closed CR7 contact in series with the control section CS1, and de-energizing such section to prevent any following conveyor unit from passing through it. Control section CS2 remains energized through the closed contact of limit switch LS5 so that the conveyor unit may proceed through such control section to enter the elevator. The closing of control relay CR7 also completes a circuit through the forward energizing coil encircled F of a reversing line contactor thereby closing the F contacts of such contactor energizing the elevator power bars PB1 and PB2 with phase L1 and L2, respectively, thereby supplying power to the conveyor unit within the elevator. When the conveyor unit has come within its stopping distance of being fully within the elevator, its control shoe contacts the de-energized control section CS3 thereby opening the energizing circuit to the conveyor unit's motor (see Fig. 11). As the conveyor unit comes to a stop, its forward trolley wheel depresses a limit switch LS4, which limit switch is incorporated in a positive stop not shown. The depressing of limit switch LS4 by the conveyor unit after it has entered the elevator closes the circuit from L1 to L2 through the contacts of control relay CR7, limit switch LS6, limit switch LS4 and the energizing coil encircled U of the reversing line contactor for the elevator motor, thus closing the U contacts of such line contactor and establishing the three phase circuit to the elevator motor. The elevator thereupon moves to the delivery floor which, in the present illustration, is shown as a higher floor and upon leaving the pickup floor the contacts of the limit switch LS5 are reversed, thereupon opening the normally closed contact of such relay in series with the control section CS2 de-energizing such section as well as closing the normally open contact of such relay in series with the energizing coil encircled D for the elevator motor line contactor. However, due to the now open contact CR7 in series with such energizing coil, the circuit remains open.

When the elevator approaches the delivery floor level and depresses the limit switch LS6, the normally closed contact of such limit switch in series with the energizing coil of the line starter encircled U for the elevator motor is opened thereupon de-energizing such motor and permitting the elevator to slow down and contact a positive stop at the delivery floor level. Simultaneously, the normally open LS6 contact in series with the reverse line contactor energizing coil encircled R for the power bars PB1, PB2 in the elevator is closed, thereby energizing such conductor bars with the reverse phases corresponding to that of the delivery floor, as well as causing the control section CS3 within the elevator to be energized so that the conveyor unit will proceed out of the elevator in a backward direction onto the delivery track. In so doing, the control pickup shoe C1 on the conveyor unit contacts pulse section PS2 in series with the tripping coil for the elevator control relay CR7 energizing such coil and returning all CR7 contacts to their normal position. A circuit is thereupon established through the normally closed contact of CR7, the now closed contact of limit switch LS5 and the energizing coil for the elevator motor line contactor encircled D which closes the D contacts in series with the elevator motor causing it to start up in the direction required to return the elevator to the pickup floor. Upon reaching the pickup floor, the elevator depresses limit switch LS5 reversing its contacts, thereupon interrupting the energizing circuit to the elevator motor and closing the LS5 contact in series with the energizing circuits for control sections CS1 and CS2 which permits another conveyor unit to enter the elevator.

The operation of the control circuit for elevator 65 (see Fig. 17) in returning the conveyor unit from the delivery floor to the pickup floor is identical with that just described except that the elevator is normally in receiving position on the delivery floor, the dotted line energizing coils encircled D and U and F and R for the elevator and conductor bar line contactors reverse the direction of travel for such elevator and the conveyor unit within the elevator. Likewise, control section CS3 is energized by a circuit passing through a normally open F contact which is closed when the elevator reaches the pickup floor.

Referring again to Fig. 11, when the conveyor unit first enters the elevator and is stopped by the de-energized control section CS3, the M contacts in series with the conveyor unit motor are opened interrupting the circuit to the energizing coil of control relay CR5. When such relay then returns to its normal position, the normally closed CR5 contact in series with the tripping coils for control relays CR1 and CR3 becomes closed. Such contact remains closed after the elevator has reached the delivery floor and the power conductor bars PB1, PB2 are energized with reverse L2, L1 phases due to the fact that each side of the energizing coil for control relay CR5 is now connected with the same L1 phase. Thus, as soon as the elevator reaches the delivery floor control relay CR1, which in the case of a loaded conveyor unit was closed when the pickup forks reached their lower position and operated to prevent subsequent lowering of such forks, is tripped thereby making it possible for an effective lowering signal to be given. In a like manner control relay CR3, which in the case of either a loaded or unloaded conveyor unit was closed when the conveyor unit first started up on the pickup floor and operated to make the forward bumper limit switch FBLS effective as well as to give the lowering and raising hoist motor line contactor energizing coils encircled L(H) and H(L) their proper sequence for the pickup floor, is tripped thereby causing the rear bumper limit switch RBLS to be effective, as is required on the delivery floor, and also causing the lowering and raising line starter coils L(H) and H(L) to be connected in proper sequence for delivery floor operation.

d. Delivery point

After the conveyor unit has entered the conveyor track on the delivery floor, it proceeds in a reverse direction to the first delivery point, shown in the present illustration as an automatic delivery point (see Fig. 1). As indicated above, whether the conveyor unit will stop at this first delivery point or proceed to the second delivery point depends upon whether or not the control relay CR4 in the conveyor unit control circuit has been closed. In the event that such relay is not closed, the conveyor unit will stop and unload at the first delivery point. The control circuit at the automatic delivery point by which such operation is accomplished is shown in Fig. 18 and may be best understood by reference also to Figs. 17 and 11.

As the conveyor unit approaches the first delivery point, the pickup shoe C1 in contact with the control conductor bar CB1 passes through an insulated section CS4 in such control conductor bar which is normally energized by a circuit passing through the normally closed contact of a timer T1. The pickup shoe H1 in contact with the hoist conductor bar HB1 then enters an insulated section HS2 in the hoist conductor bar HB1 which is in series with the energizing coil of a spring return relay CR8. In order for a circuit to be established to energize such relay which is connected to ground (L3) on one side, it is necessary that another phase of current be supplied through the conveyor unit pickup shoe H1 when it contacts the insulated section HS2. Such phase is supplied from the power conductor bar L2 through the iron core reactor and the normally opened contact of control relay CR4 when such relay is closed, but if it is not closed, no such closed circuit is established. In the latter case, as the conveyor unit proceeds, the control shoe C1 in contact with the control conductor bar CB1 contacts pulse section PS3 which momentarily closes a circuit from L1 to L2 through the normally closed contact of relay CR8 and the energizing coil of the timer T1 reversing the contacts of such timer for the predetermined time required for the timer to "run out." The normally closed contact T1 of such timer in series with control sections CS4 and CS5 thereupon opens, de-energizing such sections and the normally open contact T1 closes completing circuits through the closing coils of control relays CR9, CR10 thereby reversing the contacts of such relays. The normally open contact CR9 in series with the insulated section HS3 in the hoist conductor bar HB1 thereupon closes energizing such section so that when the hoist pickup shoe enters such section, a circuit is established from L1 to L3 through the energizing coil encircled CR2 of control relay CR2 in the conveyor unit control circuit thereby reversing the normal contacts of such relay. The pickup mechanism thus starts to lower while the conveyor unit is still in motion due to the circuit established through the normally open contact of control relay CR2 which is now closed, the normally closed contact of the lower limit switch LLS, the normally closed contact of control relay CR3 and the energizing coil encircled H(L) of the line contactor for the hoist motor. It will be noted that control relay CR3 which is closed on the pickup floor by a circuit from L2 to L1 through the closing coil of such relay remains in its normal tripped position on the delivery floor due to the fact that a reversal of phase in the power conductor bars PB1, PB2 results in an L1 phase on each side of such closing coil when the conveyor unit is on the delivery floor.

It will further be noted that due to the reversal of phase in the power conductor bars, the H(L) contacts which cause the hoist motor to run in a raising direction on the pickup floor now cause such hoist motor to run in a lowering direction. When the pickup shoe C1 in contact with the control conductor bar enters de-energized section CS5, the conveyor unit is stopped and the pickup mechanism continues to lower the load on to the belt conveyor 63 beneath such point, after which the lower limit switch LLS is depressed opening the normally closed contact of such switch in series with the energizing coil encircled H(L) thereby stopping the hoist motor.

After the load has been fully lowered and the timer T1 has run out returning its contacts to normal position, de-energized sections CS4 and CS5 become re-energized and the conveyor unit starts up once more, the pickup mechanism remaining in lowered position due to the fact that control relay CR2 remains energized through the contact of the hoist shoe H1 with the energized section HS3 of the hoist conductor bar HB1. When the pickup forks 30 are clear of the load, pulse section PS4 is contacted closing a circuit through the tripping coil of control relay CR9 which returns the CR9 contact in series with the insulated section HS3 in the hoist conductor bar HB1 to its normally open position, thereby de-energizing such section and causing control relay CR2 in the conveyor unit to return to its normal position. A circuit is thereupon established through the normally closed contacts of control relay CR2, hoist limit switch HLS, control relay CR3 and the energizing coil encircled L(H) of the line contactor for the hoist motor causing such motor to raise the pickup mechanism to its normal upper position.

The conveyor unit now proceeds past the second delivery point (see Figs. 19 and 20) without stopping and without lowering the pickup mechanism due to the fact that the insulated sections CS6 and CS7 in the control conductor bar CB1 are normally energized by a circuit passing through the normally closed contact of control relay CR12 and the insulated section HS5 in the hoist conductor bar HB1 is normally de-energized because of the normally open contact of control relay CR12 in series with the energizing circuit for this section. Control relay CR12 is not closed until control relay CR13 is energized which can only occur when a circuit through the iron core reactor is established as the pickup shoe H1 in contact with the hoist conductor bar HB1 contacts the insulated section HS4 in such conductor bar.

In the event that the control relay CR4 in the conveyor unit control circuit becomes closed when a load is picked up, the conveyor unit passes through the first delivery point without stopping or lowering the pickup mechanism and proceeds to the second delivery point in the following manner. After the conveyor unit has passed the normally energized section CS4 in the control conductor bar (Fig. 17), the pickup shoe H1 in contact with the hoist conductor bar HB1 enters the insulated section HS2 in such conductor bar. A circuit is thereupon established from L2 to L3 energizing the control relay CR8. Such circuit passes from the power pickup shoe P1 in the conveyor unit through the iron core reactor, the now closed contact CR4, the hoist pickup shoe H1, section HS2 in the hoist conductor bar and the energizing coil encircled "CR8" of control relay CR8 thereby reversing contacts of such relay. Relay CR8 remains energized as the control pickup shoe C1 passes pulse section PS3, thereby preventing the energizing of timer T1 due to the now open CR8 contact in series with such energizing circuit.

Since the timer T1 is not energized, control relay CR9 is not closed and the normally open contact of control relay CR9 in series with the energizing circuit for insulated section HS3 in the hoist conductor bar HB1 prevents such section from being energized and the normally closed contact T1 in the energizing circuits for section CS4 and CS5 in the control conductor bar CB1 causes such sections to remain energized, thereby permitting the conveyor unit to pass through the delivery point without stopping and without lowering its hoist mechanism. When the conveyor unit reaches the second delivery point (Fig. 19) and has passed the normally energized section CS6 in the control conductor bar CB1, the pickup shoe H1 in contact with the hoist conductor bar HB1 enters the insulated section HS4 in such conductor bar and a circuit energizing relay CR13 is established through the iron core reactor as previously indicated.

The closing of the normally open CR13 contact closes control relay CR12 and the reversal of the CR12 contacts simultaneously de-energizes sections CS6 and CS7 in the control conductor bar CB1 and energizes section HS5 in the hoist conductor bar HB1. Thus, as the pickup shoe H1 in contact with the hoist conductor bar HB1 enters section HS5, a circuit is established energizing control relay CR2 in the conveyor unit which passes from the power pickup shoe P1 energized with phase L2 through the now closed contact of control relay CR4, the normally closed contact of control relay CR1, the energizing coil of control relay CR2, and the pickup shoe H1 in contact with section HS5 which is energized with current of L1 phase. The energizing of control relay CR2 causes the pickup mechanism to lower in a manner previously described and when the pickup shoe C1 in contact with the control conductor bar CB1 reaches the de-energized section CS7 in such conductor bar, the conveyor unit is stopped. The load thereupon continues to be lowered until the lower limit switch LLS is depressed and awaits removal by manually operated means. When such removal has been effected, a manual switch is depressed closing the circuit to the tripping coil of control relay CR12 returning such relay to its normal position, thereby re-energizing sections CS6 and CS7 in the control conductor bar CB1 and de-energizing section HS5 in the hoist conductor bar H1. This again starts the conveyor unit in motion and causes the pickup mechanism to be raised to its normal upper position as previously described.

The tripping coil of control relay CR4 is energized by a circuit passing through a contact Ma of the line contactor for the conveyor unit motor (which contact is open whenever the conveyor unit motor is running) and a normally open contact of control relay CR2. These contacts are simultaneously closed when the conveyor unit motor is stopped by the de-energized control section CS7 thus tripping control relay CR4. Control relay CR2 continues to be energized by a circuit from LS to L1 previously described until hoist section HS5 is de-energized.

It will be noted that de-energized sections CS4 and CS6 in the control conductor bar C1 operate to stop the approach of any subsequent conveyor unit while a preceding conveyor unit is unloading.

*e. Belt conveyor*

The operation of the belt conveyor, as heretofore indicated, is such as to move loads away from the automatic delivery point to make room for further loads to be delivered. The control circuit for such operation is included in the schematic diagram shown in Fig. 18.

Referring to Figs. 17, 17a and 18, it will be seen that the belt conveyor 63 is normally at a standstill and moves only when the B contacts in series with the three phase leads of the belt motor are closed. The belt motor contactor coil encircled "B" may be controlled manually by pushing the stop button and manually depressing the "inch" button completing a circuit from L1 to L3 through the energizing coil of such contactor. During automatic operation it is necessary that both control relay contacts CR9 and CR10 in series with such coil be simultaneously closed or that the normally open CR11 contact be closed in order to complete the energizing circuit.

It will be seen that when the timer T1 is energized reversing its contacts, control relays CR9 and CR10 are simultaneously closed thus opening the CR9 contact and closing the CR10 contact in series with the energizing coil encircled "B" for the belt motor line contactor. Thus, it is not until a load has been lowered onto the belt conveyor 63 and the conveyor unit has moved on to contact pulse section PS4 that a circuit is established energizing the line contactor coil B. When pulse section PS4 is contacted tripping control relay CR9, such circuit is established and the belt motor is thereby started. At the end of one revolution of the conveyor driving wheel 68 and the corresponding revolution of the cam 72 attached to such wheel, a cam finger 72a depresses the limit switch LS7 thereby closing the normally open contact of such limit switch in series with the tripping coil of control relay CR10. As soon as such LS7 contact is closed tripping control relay CR10, relay CR11 is simultaneously energized closing the normally open CR11 contact in series with the energizing coil of the line contactor B. Thus, the energizing circuit for the conveyor motor is maintained during that portion of the revolution of cam 72 during which the limit switch LS7 is depressed. As soon as the cam finger 72a has passed limit switch LS7 opening its contacts, relay CR11 is de-energized stopping the belt motor.

ALTERNATIVE DOUBLE ELEVATOR

It may be desirable, depending on the number of conveyor units in operation, to provide two or more elevators for moving the conveyor units from the pickup to the delivery floor and a corresponding number of elevators for returning conveyor units to the pickup floor.

Figure 21:
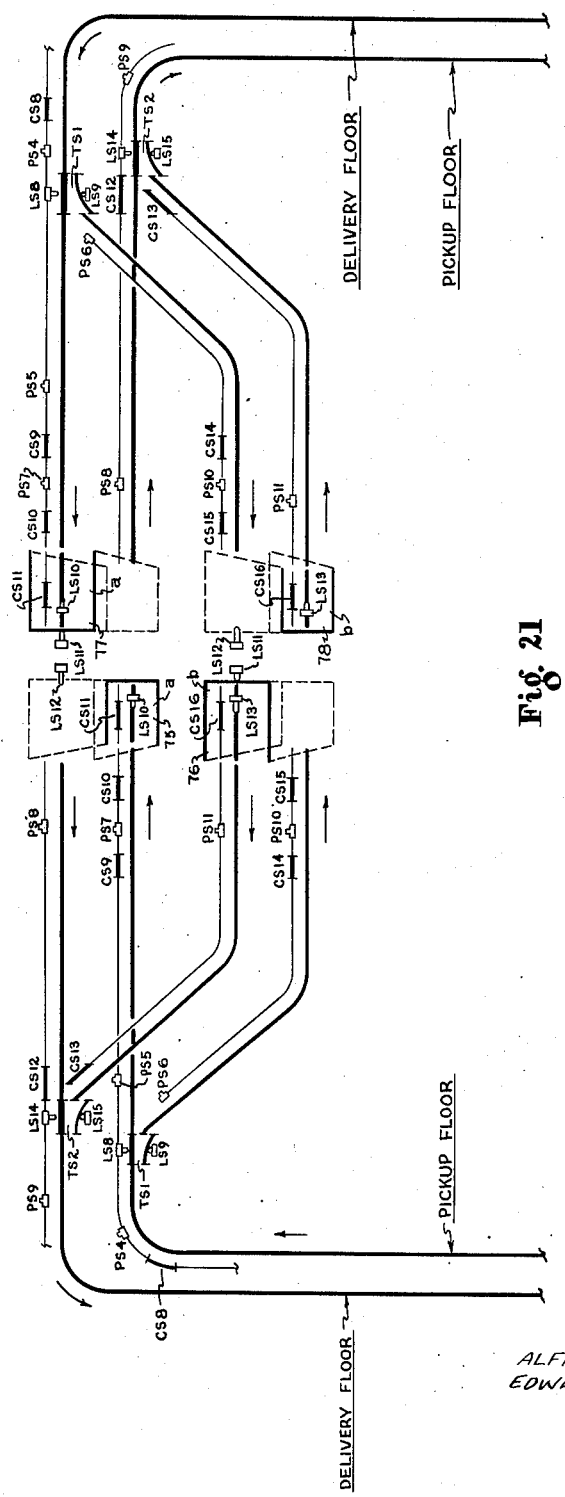
Fig. 21 is a schematic view of an alternative elevator system used in two floor operation showing a pair of counterbalanced elevators operating between pickup and delivery floors and a second pair of counterbalanced elevators operating between delivery and pickup floors as well as track switches used in connection with each pair of elevators.

Referring to Fig. 21, a schematic elevator layout is shown utilizing a pair of counterbalanced elevators 75, 76 for travel from the pickup to the delivery floor and another independent pair of counterbalanced elevators 77, 78 for travel from the delivery back to the pickup floor. In general the construction and operation of the elevators is such that when one elevator is at the pickup floor, the counterbalanced elevator is at the delivery floor and movement of one elevator is accompanied by an opposite movement of the other. The operation of the track switch TS1 is such as to lead an entering conveyor unit to whichever elevator is in receiving position and the operation of track switch TS2 is such as to always be in position to pass a conveyor unit leaving an elevator. Thus, it is not required that an elevator return immediately after moving a conveyor unit from one floor to another, but instead such elevator awaits the arrival of another conveyor unit before completing its return cycle.

Figure 22:
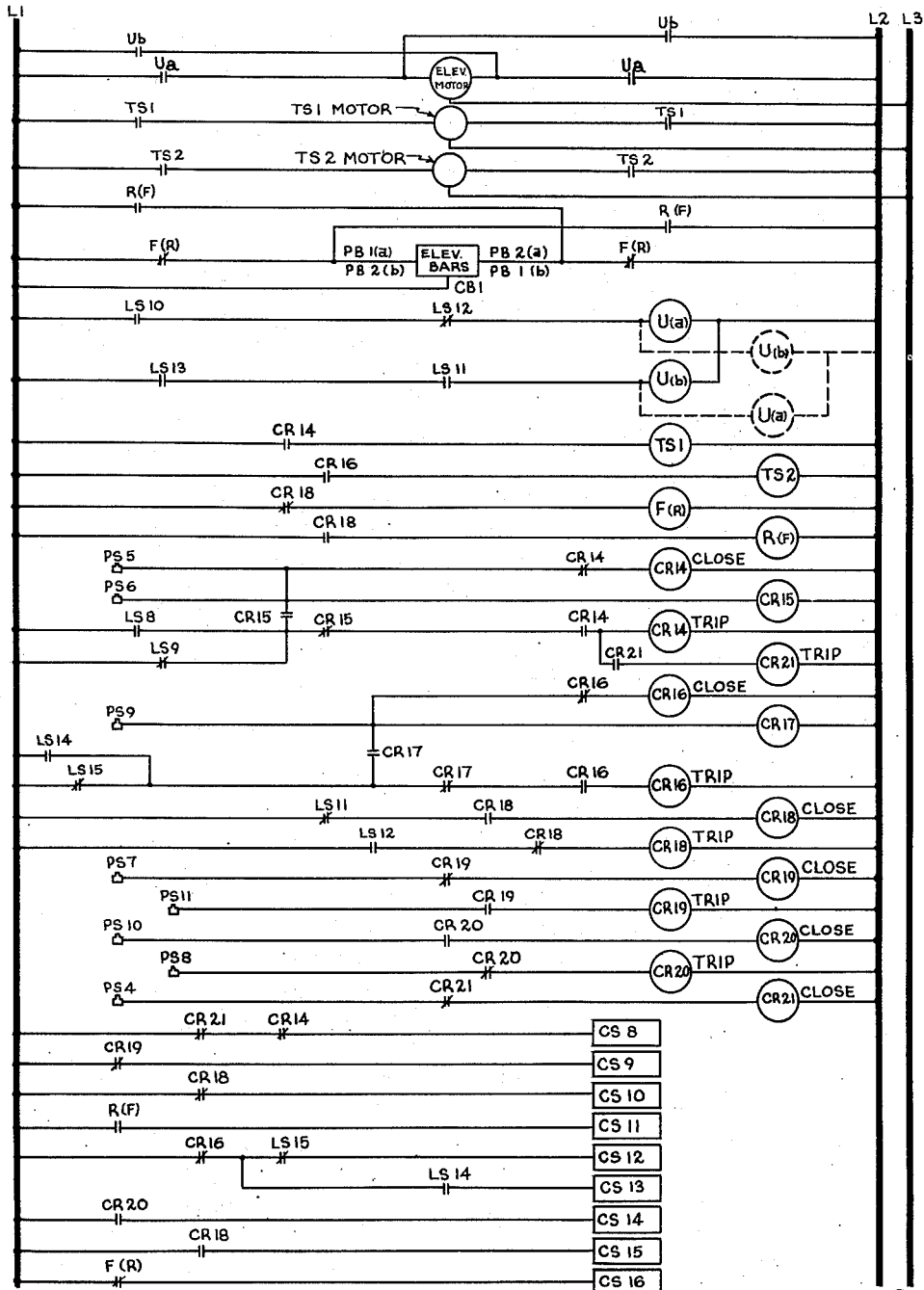
Fig. 22 is a schematic diagram of the control circuit for such alternative elevator system.

More specifically and with additional reference to the schematic diagram of the control circuit shown in Fig. 22, when a conveyor unit on the pickup floor approaches the entrance track switch TS1, it passes through a control section CS8 which is energized due to the normally closed contacts of control relays CR14 and CR21. Upon energizing pulse section PS4, control relay CR21 is closed thereby de-energizing control section CS8 and blocking the approach of a subsequent conveyor unit. After the conveyor unit passes through the track switch TS1, shown in a position leading to elevator 75 which is in receiving position at the pickup floor level, the conveyor unit energizes pulse section PS5 thereby closing control relay CR14. The control relay contact CR14 in series with the energizing coil encircled TS1 for the track switch TS1 motor line contactor is thereby closed energizing such coil and causing the track switch TS1 motor to start. Control relay CR15, a spring return type, is also energized by pulse section PS5 and upon the reversal of its contacts a maintaining circuit is established through the closed contact of limit switch LS9 which prevents a tripping circuit from being established through the tripping coil of control relay CR14 during the initial movement of track switch TS1 away from limit switch LS9. As soon as limit switch LS9 is released, control relay CR15 becomes de-energized and upon completion of the track switch's movement to its other position, limit switch LS8 is depressed completing the circuit to the tripping coil of control relay CR14 and thereby stopping the track switch TS1 motor. Such tripping circuit also serves to trip control relay CR21 thereby re-energizing control section CS8 and permitting a subsequent conveyor unit to move through the track switch TS1 toward the elevator 76. In doing so, control section CS8 is again de-energized and pulse section PS6 when energized again closes control relay CR14 and energizes control relay CR15 causing the track switch TS1 motor to start up. A reciprocating linkage between the track switch and the motor permits a unidirectional motor to alternately move the switch to each of its operative positions. Thus, the switch is moved back to its first position, limit switch LS9 completing the tripping circuit to control relay CR14 when such movement is completed.

As the first mentioned conveyor unit proceeds toward elevator 75, it passes control section CS9, which is energized due to the closed contact of control relay CR19, and energizes pulse section PS7 which closes control relay CR19 and thereby de-energizes control section CS9 blocking the approach of a subsequent conveyor unit. The conveyor unit then passes control section CS10, which is energized due to the closed contact of control relay CR18, and enters the elevator 75 being stopped by the de-energized control section CS11 and depressing limit switch LS10 as it comes to a stop. The closing of the limit switch LS10 contact in series with the energizing coil encircled "Ua" of the reversing line contactor for the elevator motor closes the circuit to such coil which in turn closes the Ua contacts in the energizing circuit for the elevator motor thereby causing the elevator 75 (also designated as an "a" elevator) to move toward the delivery floor and the elevator 7b, or "b" elevator to move toward the pickup floor. As the "a" elevator approaches the delivery floor, it depresses limit switch LS12 thereby de-energizing the elevator motor and comes to a positive stop at the floor level. The depression of limit switch LS12 also trips control relay CR18 (shown in the diagram in a closed state) thereby de-energizing the coil encircled F(R) and energizing the coil encircled R(F) of the reversing line contactor for the elevator conductor bars which reverses the L1, L2 phase connections to the power bars PB1, PB2 of both elevators and also energizes the control section CS11 in the "a" elevator and de-energizes the control section CS16 in the "b" elevator.

The conveyor unit now moves in reverse direction out of the "a" elevator energizing pulse section PS8 which trips control relay CR20 and thereby energizes the control section CS14 which has theretofore blocked the approach of a second conveyor unit to the "b" elevator. As the first conveyor unit proceeds in reverse direction on the delivery floor, it passes control section CS12, passes through the track switch TS2 and contacts pulse section PS9 which closes control relay CR16 and energizes control relay CR17 thereby energizing the line contactor coil encircled TS2 and starting the track switch TS2 motor. While the track switch TS2 is in motion, both control sections CS12 and CS13 are de-energized due to the control relay CR16 contact which opens when control relay CR16 closes. When the track switch TS2 reaches its other position, limit switch LS14 is depressed tripping control relay CR16 and thereby stopping the track switch TS2 motor. The depression of limit switch LS14 together with the tripping of control relay CR16 energizes control section CS13 permitting a conveyor unit from the "b" elevator to pass but control section CS12 remains de-energized due to the limit switch LS15 contact in series with such control section's energizing circuit until the track switch TS2 returns to its first position as shown in Fig. 21.

As indicated above, a second conveyor unit having passed through track switch TS1 in a position leading to the "b" elevator 76 will have been stopped by the de-energized control section CS14 until the first conveyor unit energizes pulse section PS8 upon leaving the "a" elevator. The second conveyor unit at such time proceeds past control section CS14 energizing pulse section PS10, which closes control relay CR20 and again de-energizes control section CS14, and passes control section CS15 which is now energized due to the fact that control relay CR18 was tripped upon the depression of limit switch LS12 by the "a" elevator. After the second conveyor unit has entered the "b" elevator, it is stopped by control section CS16 which became de-energized when the tripping of control relay CR18 de-energized the F(R) line contactor for the elevator conductor bars PB1 and PB2. The depression of limit switch LS13 by the conveyor unit as it comes to a stop within the elevator energizes the Ub line contactor for the elevator motor (the LS11 contact having been closed when the "b" elevator released limit switch LS11 upon leaving the delivery floor) and the "b" elevator thereupon proceeds to the delivery floor where it is stopped by the depression of limit switch LS11 which again closes control relay CR18 reversing the phase to the elevator conductor bars PB1 and PB2 and energizing control section CS16. As the conveyor unit then leaves the elevator, it energizes pulse section PS11 which trips control relay CR19 thereby permitting another conveyor unit to pass control section CS9 and enter the "a" elevator, and after it passes through track switch TS2, it energizes pulse section PS9 thereby causing such track switch to move back to the position shown in Fig. 21 whereupon the entire operating cycle of the elevators 75 and 76 is completed.

It will be noted that as long as the elevators are moving the conveyor units as fast as they arrive, the track switch TS1 will always lead to a receiving elevator. However, if during a particular period the conveyor units approach the elevators at a rate faster than they can be moved, the track switch TS1 will alternately lead them toward each of the two elevators where they will be stopped by control sections CS9 and CS14. It will also be seen that track switch TS2 is always in a position to pass a conveyor unit leaving either elevator.

The operation of the return elevators 77 and 78 is identical to that of elevators 75 and 76 except that the direction of travel is reversed as indicated by the broken line circuits to the elevator motor line contactors Ub and Ua which may be referred to in applying the control circuit shown in Fig. 22 to the return elevators 77, 78.

SINGLE FLOOR OPERATION

The adaptation of the automatic pickup and delivery system described above to single floor operation, as previously indicated and shown in Fig. 2, has been accomplished by the use of a single continuous conveyor line passing over all pickup points and both delivery points. The control circuits for the conveyor units and pickup points are identical to those described above. However, since the conveyor units generally travel in a forward direction and move in a reverse direction only during the unloading operation itself, a modified control circuit is used for each of the two delivery points.

Figure 23:
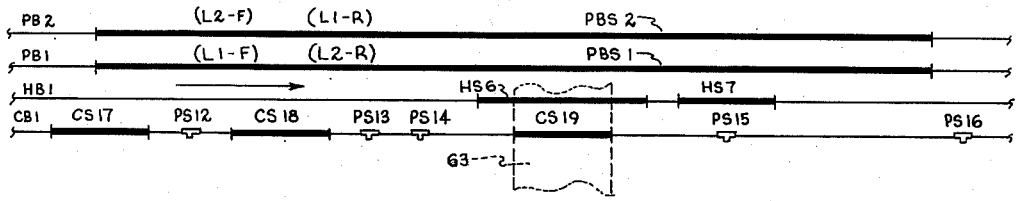
Fig. 23 is a schematic view of the conductor bars at the first delivery point used in single floor operation.

Referring to the schematic representation of the conductor bars at the first delivery point, shown in Fig. 23, insulated sections PBS1 and PBS2 in the power conductor bars PB1 and PB2 are provided at the delivery point for purposes of reversing the direction of travel of the conveyor unit, insulated sections CS17, CS18 and CS19 in the control bar CB1 are provided for stopping the conveyor unit, insulated sections HS6 and HS7 in the hoist bar HB1 are provided for selective signaling and operation of the conveyor unit pickup forks, and pulse sections PS12, PS13, PS14 and PS15 are provided for obtaining momentary electrical signals in response to the passing of a conveyor unit.

Figure 24:
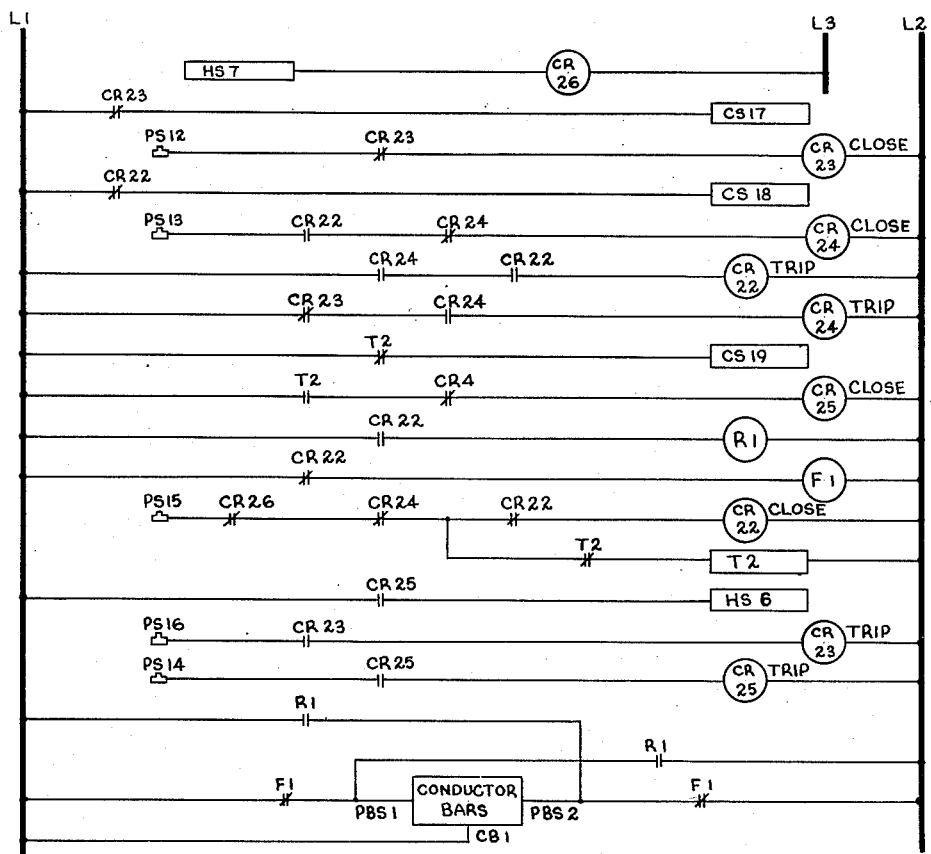
Fig. 24 is a schematic diagram of the control circuit located at such delivery point.

With reference to Fig. 24, the operation of the control circuit for the first delivery point, which has again been chosen to illustrate fully automatic unloading, may be understood by following through a typical case. Assuming that a conveyor unit approaches the first delivery point with a load identified for the second delivery point (control relay CR4 in the conveyor unit circuit being closed), such conveyor will first pass control section CS17 which is normally energized by a circuit passing through a closed contact of control relay CR23. The insulated sections PBS1, PBS2 in the power bars PB1 andn PB2 are energized with normal phases corresponding to forward travel due to the closed energizing circuit for the forward contactor coil encircled F1 which closes the forward contact F1 in the energizing circuits for sections PBS1 and PBS2, and the conveyor unit therefor proceeds in a forward direction. The control shoe C1 in passing energizes pulse section PS12 which closes the circuit to the closing coil of control relay CR23 thereby reversing such relay's contacts and de-energizing control section CS17 so as to stop any subsequent conveyor unit.

The conveyor unit next proceeds past control section CS18 which is energized by a circuit passing through the normally closed contact of control relay CR22, energizes pulse sections PS13 and PS14 without effect and passes through control section CS19 and hoist section HS6, the former section being energized by a circuit passing through a normally closed contact of timer T2. Since the conveyor unit control relay CR4 is closed in identifying the load (see Fig. 11), current of L1 phase is supplied to the hoist collector shoe H1 by a circuit passing through the iron core reactor thereby energizing hoist section HS6 with L1 phase but without any present effect. In a similar manner the hoist collector shoe H1 in passing energizes hoist section HS7 with L1 phase thereby completing a circuit from L1 to L3 through the energizing coil of spring return relay CR26 reversing its contacts during the time that the conveyor unit control shoe C1 passes over and energizes pulse section PS15. Due to the contact of control relay CR26 thereby opened in series with the energizing coil of the timer T2 and control relay CR22, neither of such latter controls are affected by the energized pulse section PS15 and the conveyor unit proceeds toward the second delivery point, energizing pulse section PS16 in passing which trips control relay CR23 re-energizing control section CS17 and permitting a subsequent conveyor unit to now proceed toward the first delivery point.

If a conveyor unit carrying a "B" load approaches the first delivery point (identified by the fact that the conveyor unit control relay CR4 is not closed during the pickup operation), hoist section HS7 will not be energized by the hoist collector shoe H1 and the control relay CR26 contacts will therefore remain in normal position permitting the energizing of pulse section PS15 to close control relay CR22 and energize the timer T2.

The closing of control relay CR22 reverses the power phase in the insulated sections PBS1, PBS2 of power bars PB1 and PB2 by de-energizing the forward contactor coil encircled F1 and energizing the reverse contactor coil R1 thereby reversing the direction of the conveyor unit's travel. The energizing of the timer T2 reverses its contacts thereby de-energizing control section CS19 and closing the control relay CR25. The closing of control relay CR25 energizes the hoist section HS6 with L1 power phase so that when the conveyor unit's hoist collector shoe H1 enters such section, a circuit is established from L1 to L3 through the energizing coil of the conveyor unit control relay CR2 causing the conveyor unit forks to start lowering as heretofore described. When the conveyor unit control shoe C1 enters the de-energized control section CS19, the conveyor unit is stopped and the forks continue to lower to unloading position. When the timer T2 runs out and its contacts are returned to normal position, control section CS19 is re-energized causing the conveyor unit to again move in reverse direction, its forks remaining in lowered position. When the conveyor unit's control shoe C1 now contacts and energizes pulse section PS14, which is spaced at a distance from the unloading point sufficient to permit the forks to withdraw completely from the load, control relay CR25 is tripped thereby de-energizing hoist section HS6, and when pulse section PS13 is energized, control relay CR24 is closed due to the now closed contact of control relay CR22 in series with the closing coil of control relay CR24. The closing of control relay CR24 trips control relay CR22, thereby returning the power phases in sections PBS1, PBS2 of the power bars PB1, PB2 to the normal forward operating phases and causes the conveyor unit to again move in a forward direction with its forks in raised position.

The conveyor unit now passes through the de-energized hoist section HS6 and energized control section CS19 and energizes pulse section PS15 without effect due to the now open contact of control relay CR24 in series with the closing coil of control relay CR22 and the timer T2. When the conveyor unit energizes pulse section PS16, control relay CR23 is tripped and the now closed contact of control relay CR23 in series with the tripping coil of control relay CR24 completes the tripping circuit for such relay, thereby returning all controls in the first delivery point control circuit in their normal position.

Figure 25:
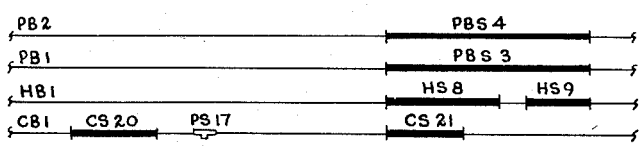
Fig. 25 is a schematic view of the conductor bars at the second delivery point used in single floor operation.
Figure 26:
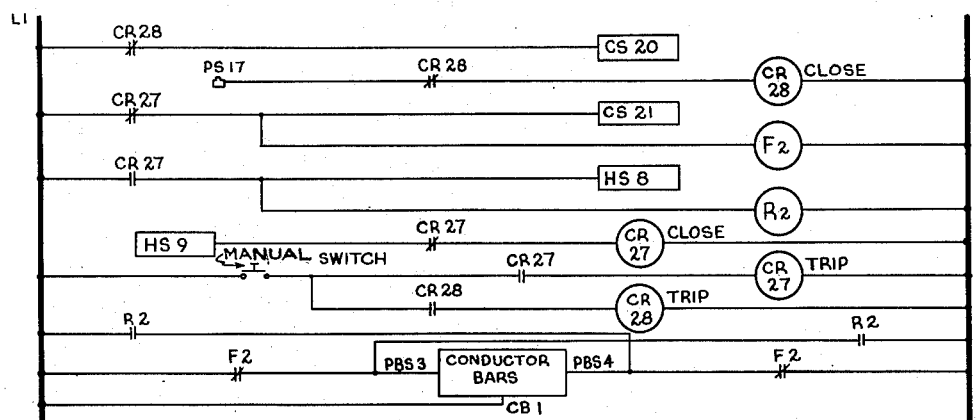
Fig. 26 is a schematic diagram of the control circuit located at such second delivery point.

With reference to Figs. 25 and 26 showing the control circuit for the second delivery point, again chosen to illustrate a semi-automatic delivery operation, it may be seen that a conveyor unit with a "B" load identified by its closed control relay CR4 will proceed through a normally energized control section CS20, energize pulse section PS17 closing control relay CR28 and thereby de-energize control section CS20 as a block against subsequent conveyor units. After entering the insulated sections PBS3, PBS4 in the power bars PB1, PB2 and passing hoist section HS8 and control section CS21 without effect, the hoist shoe H1 energizes hoist section HS9 with L1 phase by the previously described circuit through the iron core reactor in the conveyor unit control circuit, thereby closing control relay CR27 which in turn reverses the phase in sections PBS3, PBS4, energizes hoist section HS8 and de-energizes control section CS21. The conveyor unit thereupon reverses direction, begins to lower its forks, stops, completes the lowering operation and awaits removal of the "B" load. When such unloading operation is completed, a manual switch is depressed tripping control relays CR27 and CR28 thereby re-energizing control section CS21, de-energizing hoist section HS8, restoring normal forward phase to sections PBS3, PBS4, and re-energizing control section CS20. Since the load identifying control relay CR4 is tripped upon the conveyor unit's stopping at control section CS21 (see Fig. 11), the conveyor unit now raises its forks, proceeds in a forward direction and passes hoist section HS9 without energizing such section.

MULTIPLE FLOOR AND DELIVERY POINT OPERATION

Figure 27:
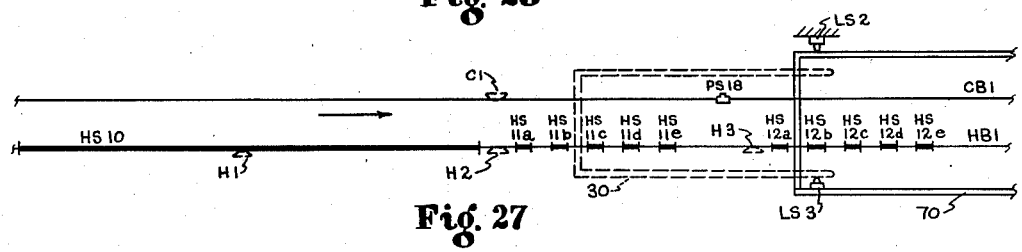
Fig. 27 is a schematic plan view of a typical pickup point used in the multiple floor-multiple delivery point system.

The conveyor units used in the modified system, which is adaptable to multiple floor and delivery point operation, are of the same construction as those previously described with the exception heretofore noted that two additional collector shoes H2, H3 are provided in advance of the hoist collector shoe H1 for contacting the hoist conductor bar HB1 (see Figs. 4 and 10). At each pickup point, as shown in Fig. 27, the hoist conductor bar HB1 is provided with an insulated section HS10, a group of insulated sections HS11a, 11b, etc., and a second group of insulated sections HS12a, 12b, etc. The first insulated section HS10, when energized and contacted by the hoist collector shoe H1, causes an unloaded conveyor unit to lower its forks in a manner previously described. Each of the insulated sections HS11a, etc. in the first group is contacted by the hoist collector shoe H2 and each of the insulated sections HS12a, etc. of the second group is contacted by the hoist collector shoe H3 during the time that the pickup forks 30 are in lowered position and depressing the limit switch LS3 on the pickup bars 70 of the loading rack.

Figure 28:
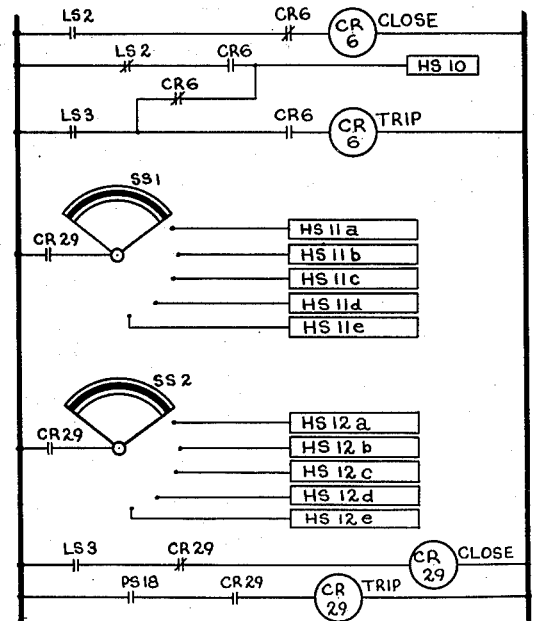
Fig. 28 is a schematic diagram of the control circuit located at each pickup point in the latter system.

Referring to the schematic diagram of the control circuit located at each pickup point shown in Fig. 28, it may be seen that a bridge type manually operated selector switch SS1, SS2 is provided for each of the two groups of insulated sections. The switch SS1 for the first group may be set to a position corresponding to the desired delivery point, and the switch SS2 for the second group, to a position corresponding to the desired delivery floor. According to the position of such switches, a predetermined number of the insulated sections in each group will be energized after the limit switch LS3 is initially depressed by the pickup forks 30 of a conveyor unit since the depression of such limit switch closes a circuit to the closing coil of control relay CR29 reversing its contacts and thereby closing the normally open CR29 contact in series with each selector switch. Since the control shoe C1 will have energized pulse section PS18 tripping control relay CR29 by the time the hoist collector shoe H1 leaves the first energized section HS10 in the hoist conductor bar H1, none of the insulated sections in either group will affect the operation of the pickup forks of a conveyor unit while it is picking up a load and such sections will at all times be de-energized with respect to any overpassing conveyor unit.

Figure 29:
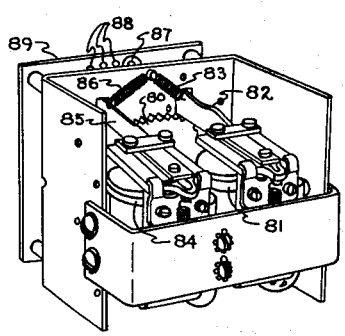
Fig. 29 is a perspective view of the "add and subtract" stepping relay used in connection with multiple floor and multiple delivery point selection.

The "add and subtract" stepping relays, one of which is used in connection with delivery point selection and the other in connection with floor selection, are each of the type shown in Fig. 29. A ratchet 80 is rotated one unit space in a clockwise direction each time the solenoid 81 is energized moving the lever arm 82 downward against the action of spring 83 into engagement with a tooth in the ratchet 80. A spring loaded ratchet dog, not shown, engages a tooth in the ratchet 80 and retains the ratchet in its new position when the solenoid 81 is de-energized and the spring 83 returns the lever arm 82 to its normal position. A similar solenoid 84, lever 85, and spring 86 operate to move the ratchet 80 in the opposite direction one unit space each time solenoid 84 is energized. A contact finger 87 is rotated by the ratchet 80 into registration with the various contact points 88 on the contact plate 89.

With reference to the modified control circuit (Fig. 30) for the conveyor unit incorporating the use of such stepping relays, it may be seen that when the conveyor unit's control relay CR2 is energized in response to the contact of the hoist collector shoe H1 of an unloaded conveyor unit with an energized section HS10 in the hoist conductor bar HB1, and when control relay CR1 is closed in response to the pickup forks reaching their lower position, the circuit from the hoist collector shoe H2 to the energizing coil of the forward stepping solenoid FS2 is closed so that each electrical impulse received from the contact of the hoist collector shoe H2 with energized sections HS11a, etc. of the hoist conductor bar HB1 will cause the delivery point stepping relay to take one step forward. In a like manner the stepping relay used in connection with floor selection will take a forward step each time the hoist collector shoe H3 contacts one of the energized sections HS12a, etc. in the hoist conductor bar HB1. During this time the normally closed contacts of control relay CR2 in series with the energizing coils of the backward stepping solenoids BS2, BS3 are open preventing such solenoids from being energized.

In the above manner a conveyor unit becomes automatically identified both as to floor and delivery point during the time that it picks up a load through the upward stepping of floor and delivery point stepping relays, and in the absence of any load neither stepping relay is actuated.

Figure 31:
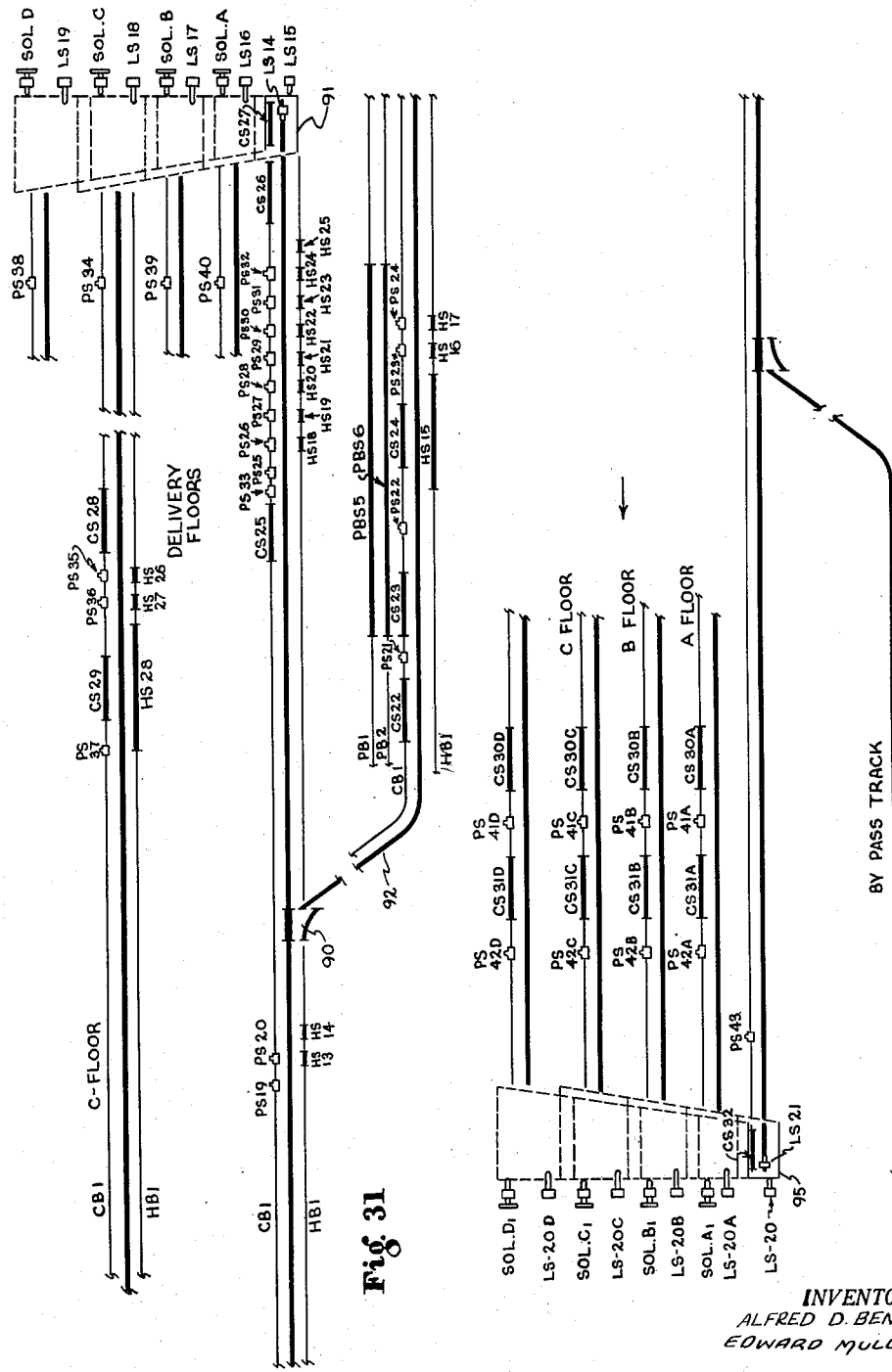
Fig. 31 is a schematic plan view of the elevator used in the multiple floor system for moving conveyor units from the pickup floor to a delivery floor including conveyor lines leading to and from and by-passing such elevator and including a typical delivery point on the pickup floor and a typical delivery point on one of the delivery floors.

As a loaded or unloaded conveyor unit proceeds along the pickup track past the last pickup point, it approaches a two way track switch, one position of which leads to an elevator and the other to a track by-passing such elevator (see Fig. 31). This two way track switch 90 is normally in a position leading to the elevator 91 and is moved to its other by-passing position in response to a positive signal given by an approaching conveyor unit. Such positive signal is given by any approaching unloaded conveyor unit as well as by a loaded conveyor unit which is to make its delivery on the pickup floor.

Figure 30:
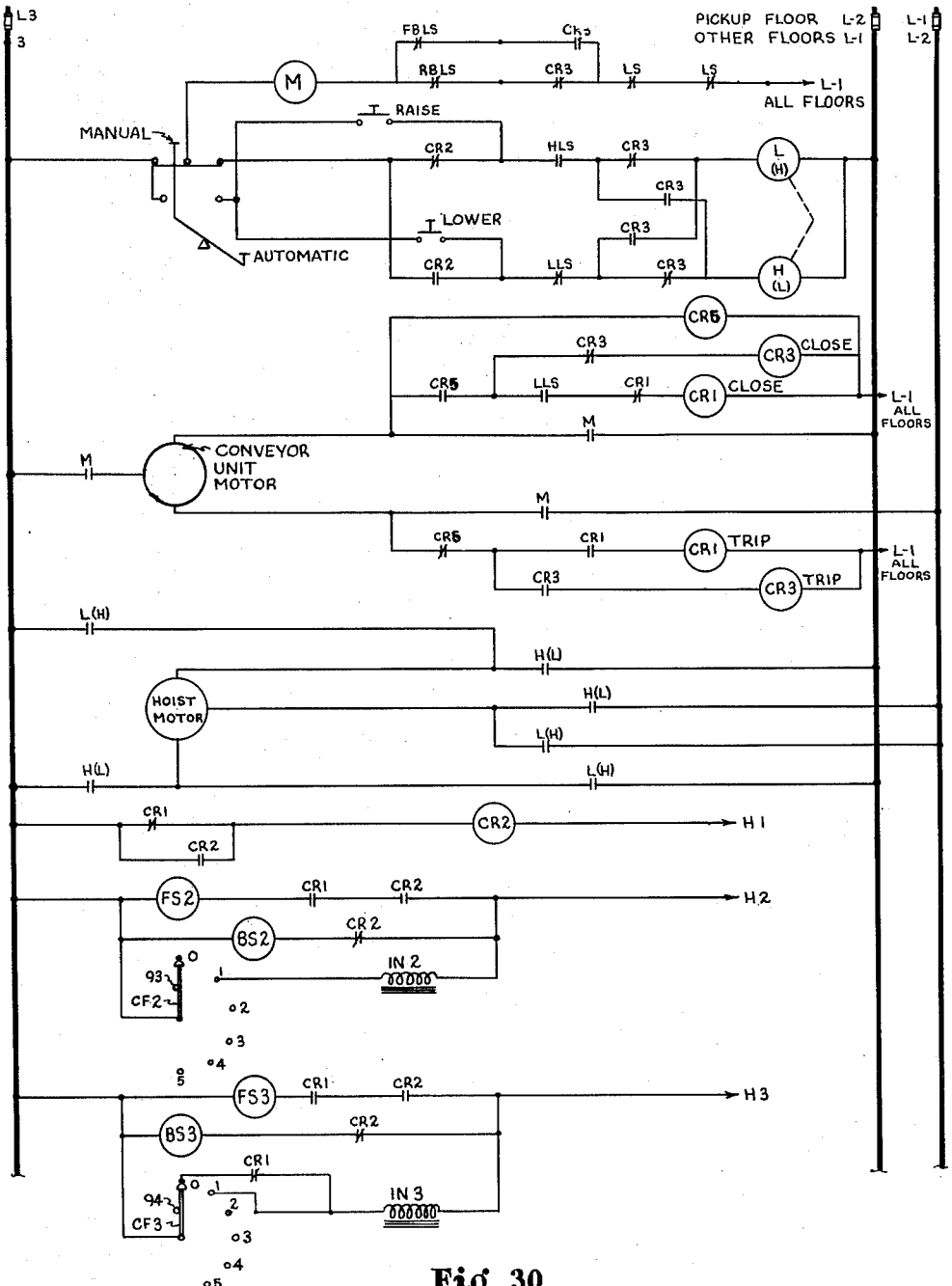
Fig. 30 is a schematic diagram of the modified control system for a conveyor unit incorporating the use of "add and subtract" stepping relays.
Figure 33:
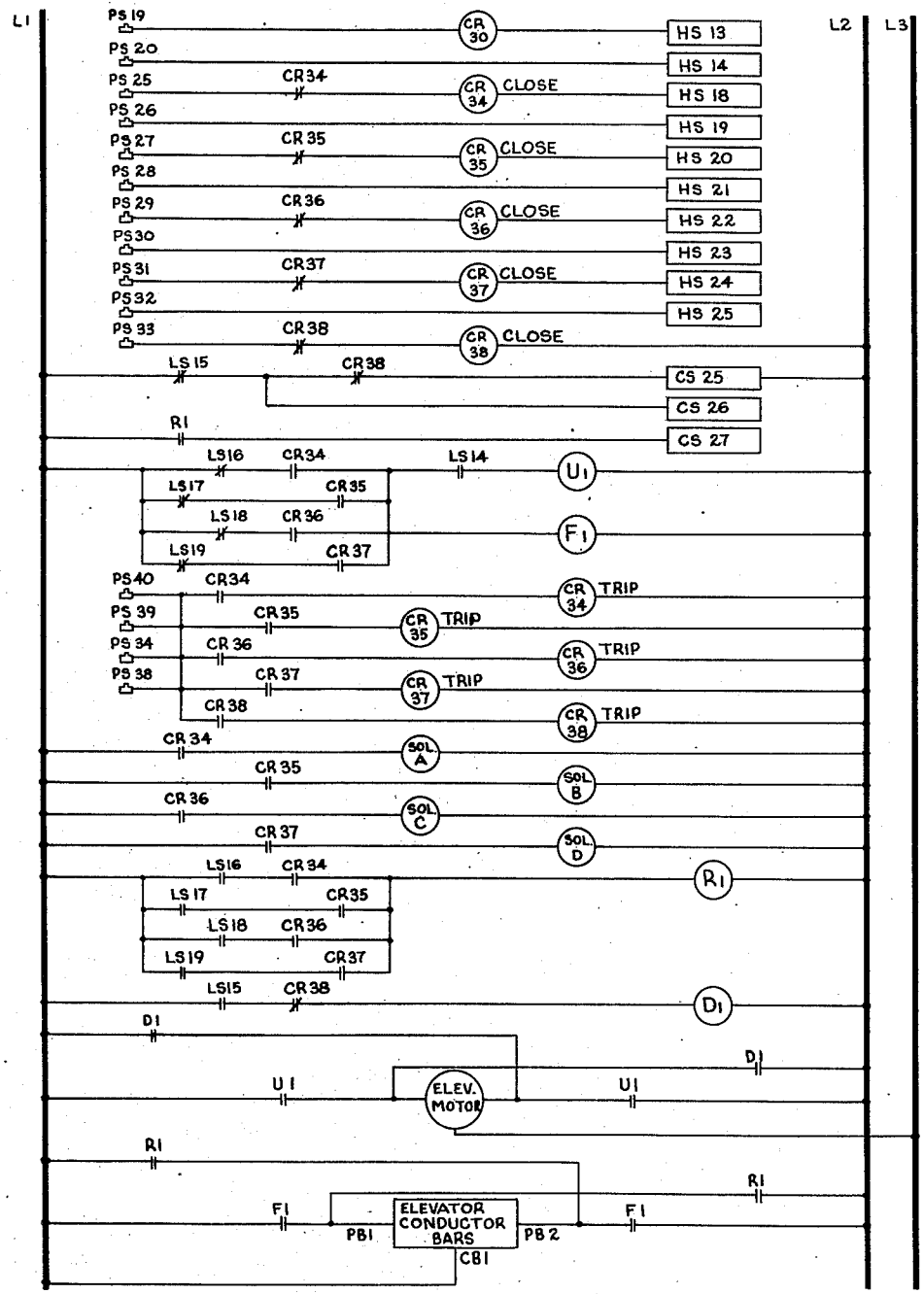
Fig. 33 is a schematic diagram of the control circuit for the elevator shown in Fig. 31.

The manner in which such positive signal is effected may be seen by reference to Figs. 30, 31 and 32. It will be noted (see Fig. 30) that the stepping relay for floor selection associated with the hoist collector shoe H3 has a contact finger CF3 which normally registers with contact number D and such finger is moved to the various other contact points only in response to one or more impulses energizing the forward solenoid FS3. As a loaded conveyor unit approaches the track switch 90, shown in Fig. 31, with its floor selection stepping relay in number 1 position, its control shoe C1 and hoist shoe H3 simultaneously contact a pulse section PS19 in the control bar CB1 and an insulated section HS13 in the hoist bar HB1, respectively. A relay CR30, the energizing coil of which is in series with such pulse and insulated sections (see Fig. 33) is thereby energized by a circuit passing from L1 to L3 through the energized pulse section PS19, the energizing coil of relay CR30, the insulated section HS13 in the hoist conductor bar HB1, the hoist collector shoe H3, the inductor IN3, the contact finger CF3 and a ground connection. The energized relay CR30 initiates the movement of the track switch 90 to its by-passing position where it remains until the conveyor unit passes through and then automatically returns to its normal position.

The track switch 90 and control circuit therefor, which operate to stop an approaching conveyor unit while the switch is in motion, stop a subsequent conveyor unit until the track switch is in normal position, and automatically return the track switch to normal position after a conveyor unit has passed through the switch in its bypassing position, are of the same type as the entrance track switch and controls therefor disclosed in copending application, Serial No. 666,609, and a detailed description of the operation thereof is accordingly omitted from the present application.

If the stepping relay for floor selection were actuated during the pickup operation moving the contact finger CF3 to a position above the number one position, the circuit through the inductor IN3 and contact finger CF3 would not be established to energize the relay CR30 and the track switch 90 would remain in its normal position. It is to be noted that the series circuit which would be established through the energizing coils of the backward stepping solenoid BS3 and relay CR30 would not be effective to actuate either the solenoid or relay since the combined resistance of such solenoid and relay coils is too high to pass an actuating current. The impedance of the inductor IN3, on the other hand, is sufficiently low to permit an effective current to energize relay CR30 when the aforementioned circuit through such inductor is established.

Prior to passing through the track switch 90, the conveyor unit's control and hoist shoes C1 and H1 simultaneously contact pulse and hoist sections PS20 and HS14, thereby causing the contact finger CF3 to move back one position due to the circuit established through the backward solenoid BS3.

In the event that an unloaded conveyor unit approaches the track switch 90 with the contact finger CF3 in zero position, a circuit is established through the inductor coil IN3 upon energizing pulse section PS19 which will cause the track switch to move to by-passing position. This circuit passes through a normally closed contact of control relay CR1 which remains closed until a load is picked up as heretofore described (see Fig. 30).

In Fig. 31 the control elements for a typical automatic unloading point on the pickup floor are shown in the by-pass track 92. The selective automatic unloading operation at such typical delivery point is similar to that described above in connection with single floor operation with the exception of the selective signaling means. As a conveyor unit approaches the delivery point, the control shoe C1 passes over normally energized control sections CS22, CS23 and CS24, energizing pulse section PS21 which closes relay CR31 (see Fig. 32) and de-energizes control section CS22, and energizing pulse section PS22 without effect. The hoist section HS15 is de-energized due to the normally open control relay CR32 contact so that the hoist shoe H1 passes over such section without effect. The control shoe C1 and hoist shoe H2 spaced opposite the control shoe on the conveyor unit will now simultaneously contact pulse section PS23 and hoist section HS16. If the contact finger CF2 (see Fig. 30) of the delivery point stepping relay is in number one position, a circuit will thereupon be established from L1 to L3 through pulse section PS23, the energizing coil of control relay CR32, hoist section HS16, the hoist shoe H2, the inductor IN2 and the contact finger CF2. Such circuit will energize control relay CR32 thereby closing control relay CR33 and starting the timer T3. If the contact finger CF2 is at a position above number one, as where a load is identified for a delivery point located past the one in question, no such energizing circuit will be established and the conveyor unit will proceed to the next delivery point. In so doing the control and hoist shoes C1 and H2 will simultaneously contact pulse and hoist sections PS24, HS17 which will cause the contact finger CF2 to move back one position due to the energizing circuit established from L1 to L3 through pulse section PS24, hoist section HS16, hoist shoe H2 and the backward stepping solenoid BS2. If, on the other hand, the contact finger CF2 is in zero position, as where an unloaded conveyor unit passes a delivery point, no circuit will be established through the inductor IN2 upon contacting pulse and hoist sections PS23, HS16 and a positive stop 93 will prevent the contact finger CF2 from being moved backwards beyond the zero position when the circuit through the backward solenoid BS2 is established upon contacting pulse and hoist sections PS24, HS17.

The closing of control relay CR33 and energizing of the timer T3 operate to reverse the phase in the insulated sections PBS5, PBS6 of the power bars PB1, PB2 thereby reversing the direction of travel of the conveyor unit, as well as to energize hoist section HS15 and de-energize control section CS24. After the conveyor unit has moved backwards to the delivery point, lowered the load onto a conveyor belt (not shown), and the timer T3 has run out, the conveyor unit moves backward withdrawing its forks from the load and energizes pulse section PS22, thereby tripping control relay CR33 and restoring the normal phase to sections PBS5, PBS6 of the power bars PB1, PB2 for forward travel as well as tripping control relay CR31 which re-energizes control section CS22 permitting subsequent conveyor units to pass. Due to the fact that the conveyor unit upon initially contacting pulse and hoist sections PS23, HS16 is traveling in a forward direction with some inertia, it will continue in a forward direction after a reversal of phase in the power bar sections PBS5, PBS6 has been effected for a short distance equal to the stopping distance with reverse power applied. By locating the pulse and hoist sections PS24 and HS17 within such stopping distance, the contact finger CF2 will be moved back to zero position before the unloading operation takes place. Accordingly, it is unnecessary to provide means such as described in connection with single floor operation for preventing a second unloading signal from being given after an unloading operation has taken place.

From the foregoing it may be seen that during the loading operation a single impulse to the forward solenoid FS2 for the delivery point stepping relay is required in order to effect delivery at the first delivery point and one additional impulse is required for each delivery point to be passed before making the delivery, while in the case of the floor stepping relay, a single impulse is given for deliveries on the pickup floor. As will now be described, two forward impulses to the floor stepping relay moving the contact finger CF3 to the number two position will cause a conveyor unit to travel to the delivery floor next adjacent the pickup floor and each additional impulse will cause the elevator to travel one floor further from the pickup floor before stopping.

In order to provide a specific example, it may be assumed that the contact finger CF3 for the floor stepping relay of a conveyor unit was moved to position number 4 by four impulses during the pickup operation. As already described, the track switch 90 will remain in its normal position leading to the elevator 91 due to the fact that no signal circuit is established upon contacting pulse and hoist sections PS19, HS13. The contact finger CF3 will be stepped back to the number 3 contact when pulse section PS20 is energized, and after the conveyor unit next passes through the track switch 90, and normally energized control section CS25, the control shoe C1 energizes pulse section PS33 closing control relay CR38 which in turn de-energizes control section CS25 blocking subsequent conveyor units. The control shoe C1 will contact pulse sections PS25—32 as the hoist shoe H3 contacts hoist sections HS18—25 and the contact finger CF3 will be stepped back successively to the number two and one contacts when pulse sections PS26 and PS28 are energized. For the reason explained above, no energizing circuit sufficient to actuate control relay CR34 or CR35 will be established upon energizing pulse sections 25 and 27. However, when the control shoe C1 contacts and energizes pulse section PS29, control relay CR36 will be closed by a circuit from L1 to L3 passing through pulse section PS29, the closing coil of control relay CR36, hoist section HS22, hoist shoe H3, inductor IN3, the number one contact, and contact finger CF3. Upon the control shoe C1 energizing pulse section PS30, the contact finger will be stepped back to the zero contact, and upon energizing pulse section PS31, a circuit through the inductor coil IN3 will not be possible due to the fact that the normally closed CR1 contact in such circuit became open when the conveyor unit picked up its load. Having reached the zero contact, contact finger CF3 will not be further stepped back when pulse section PS32 is energized due to the positive stop 94. Thus, it is seen that one and only one of control relays CR34—37 is closed upon the approach of a loaded conveyor unit to the elevator 91 in accordance with the number of forward steps taken by the floor stepping relay during the pickup operation.

The conveyor unit next proceeds through control section CS26 and into the elevator 91 when the de-energized control section CS27 stops the conveyor unit and the depression of limit switch LS14 closes the circuit to the elevator motor contactor coil encircled U1 which passes through a normally closed limit switch LS18 contact and a now closed control relay CR36 contact in series with such coil thereby starting the elevator motor. The elevator in moving past intermediate floors depresses limit switches LS16 and 17 without effect (see Figs. 31 and 33). However, upon depressing limit switch LS18, the circuit to the elevator motor contactor coil U1 is opened de-energizing the elevator motor and the elevator comes to a positive stop which was moved into the path of the elevator through the energizing of solenoid SOL-C upon the closing of control relay CR36. The elevator power conductor bars PB1, PB2 which were energized with forward phase when the contactor coil encircled F1 was energized upon the closing of control relay CR36 become energized with reverse phase upon the depression of limit switch LS18 due to the circuit thereupon established for energizing the reverse contactor coil encircled R1 passing through limit switch LS18 and control relay CR36 contacts and the R1 contact in series with control section CS27 thereupon closes a circuit for energizing such section. The conveyor unit therefore moves out of the elevator in reverse direction unto the "C" floor and energizes pulse section PS34 thereby tripping control relays CR36 and CR38 which in turn de-energizes the solenoid SOL-C, and energizes the contactor coil encircled D1 thereby starting the elevator motor in the reverse direction required for returning to the pickup floor.

The conveyor unit now proceeds in reverse direction to the particular delivery point corresponding to the position of the delivery point stepping relay. The control elements in the conductor bars for a typical automatic delivery point on a floor other than the pickup floor are shown in Fig. 31 and the schematic control circuit for such delivery point is shown at the bottom of Fig. 32.

A conveyor unit traveling in reverse direction passes through the normally energized control section CS28 and its control and hoist shoes C1 and H2 contacts pulse and hoist sections PS35 and HS26. If the contact finger CF2 is in number one position, a circuit through the inductor IN2 energizes control relay CR39 thereby closing control relay CR40 and starting the timer T4. The control shoe C1 next energizes pulse section PS36 thereby establishing a circuit stepping the contact finger CF2 back to zero position. The closing of control relay CR40 de-energizes control section CS28 and energizes hoist section HS28 thereby causing the pickup forks to lower, and the reversal of the timer contacts T4 de-energizes control section CS29 stopping the conveyor unit while the load is lowered unto a conveyor belt (not shown) and until the timer runs out whereupon the conveyor unit proceeds in reverse direction with forks in lowered position energizing pulse section PS37 which trips control relay CR40 de-energizing hoist section HS28 and re-energizing control section CS28. The conveyor unit will now proceed in reverse direction over all subsequent delivery points without stopping or lowering its forks.

As heretofore noted, positive stops 93, 94 will prevent the contact fingers CF2 and CF3 from being stepped back beyond the zero contact so that upon the conveyor unit's return to the pickup floor, the delivery point and floor stepping relays will in every case be in a proper position to receive new identifying signals upon picking up a new load.

After passing over all delivery points on the "C" floor, the conveyor unit in question approaches the return elevator 95 which is normally in a discharge position on the pickup floor, as shown in the schematic view of Fig. 34. The operation of the return elevator in general is such as to give precedence to the first conveyor unit, or in the event of the simultaneous arrival of two or more conveyor units on different floors, to give precedence to such conveyor units returning, the one nearest the pickup floor first, then the one next nearest, etc.

Figure 35:
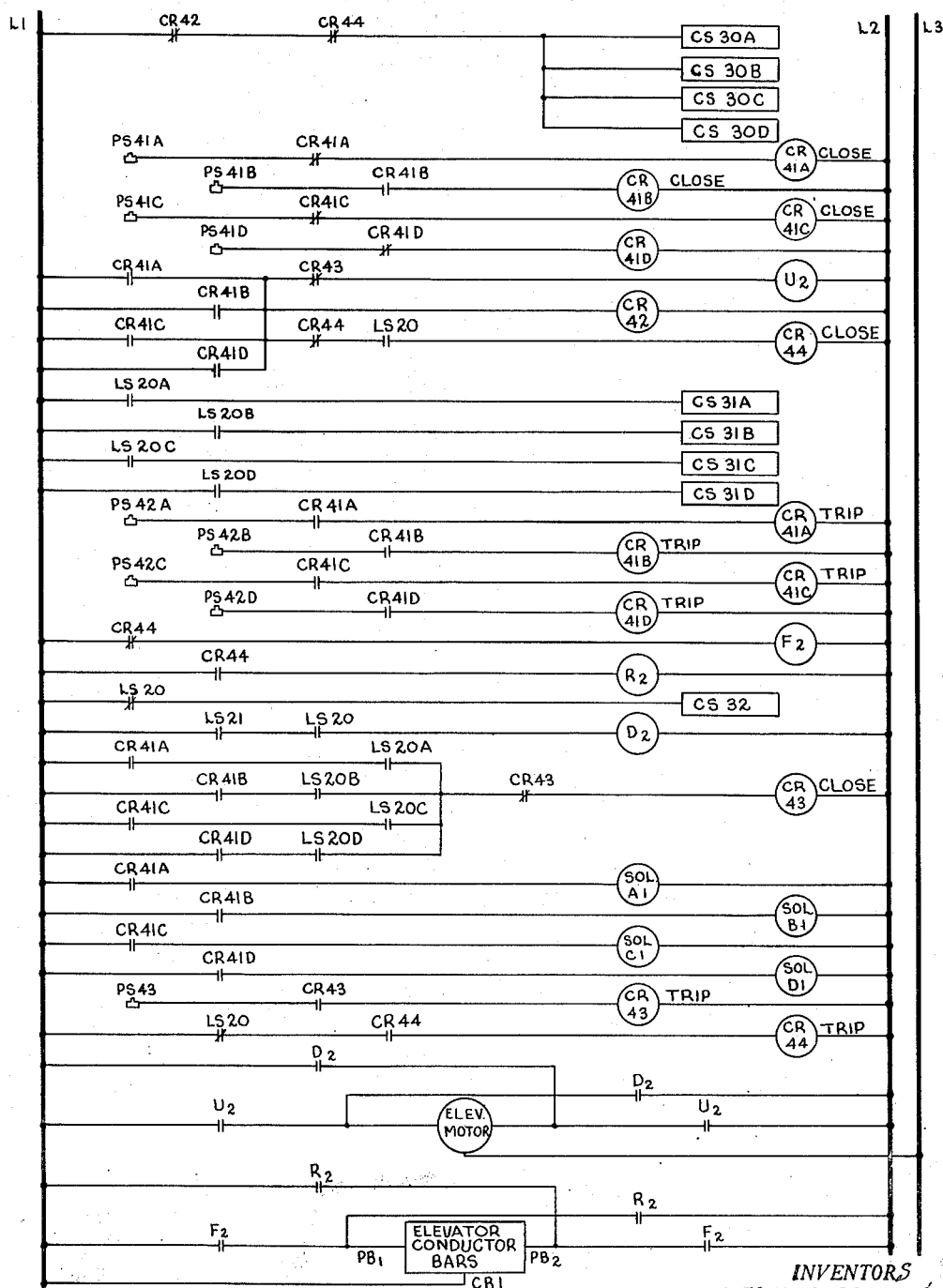
Fig. 35 is a schematic diagram of the control circuit for the return elevator shown in Fig. 34.

More specifically, the operation of the control circuit for the return elevator, as shown in Fig. 35, may be seen by first taking the case where a single conveyor unit approaches the elevator and then the case where two or more conveyor units approach simultaneously.

Referring again to the conveyor unit approaching in reverse direction the return elevator on the "C" floor, such conveyor unit will first pass through control section CS30C normally energized due to the closed contacts of control relays CR42 and CR44. Upon energizing pulse section PS41C, control relay CR41C is closed which in turn completes the circuit for energizing the contactor coil encircled U2 for the elevator motor causing the elevator to start up, completes the circuit for energizing spring return relay CR42 causing control sections CS30A, B, C and D to be de-energized, and completes the circuit for energizing solenoid SOL–C1 causing a positive stop for the "C" floor to be moved to an operative position. The conveyor unit is stopped by the de-energized control section CS31C pending the arrival of the elevator, and as the elevator leaves the pickup floor, limit switch LS20 is released thereby completing the circuit to the closing coil for control relay CR44. The closing of such relay adds a new open contact to the energizing circuit for control sections CS30A–D, opens the circuit to the forward contactor coil encircled F2 for the elevator conductor bars, and closes the circuit to the reverse contactor coil encircled R2 for such conductor bars. The elevator will pass the A and B floors depressing limit switches LS20A and LS20B without effect. However, upon depressing limit switch LS20C, a circuit to the closing coil of control relay CR43 is established through the closed contacts of control relay CR41C and limit switch LS20C. The closing of control relay CR43 opens the circuit to the elevator contactor coil U2 and the elevator comes to a positive stop against the stop actuated by solenoid SOL–C1. The depression of limit switch LS20C also energizes control section CS31C permitting the conveyor unit to proceed. When the conveyor unit energizes pulse section PS42C, control relay CR41C is tripped thereby opening the energizing circuit for control relay CR42. Control sections CS30A–D remain de-energized due to the now open contact of control relay CR44 in their energizing circuit. After the conveyor unit has entered the elevator, it is stopped by de-energized control section CS32 and limit switch LS21 is depressed, thereby completing the circuit to the elevator motor contactor coil encircled D2 causing the elevator to move back to the pickup floor.

When the elevator depresses limit switch LS20 at the pickup floor, the circuit to the coil D2 is opened stopping the elevator, control relay CR44 is tripped causing the reverse contactor coil R2 to be de-energized and the forward coil F2 to be energized and control section CS32 within the elevator is energized, thereby permitting the conveyor unit to proceed out of the elevator in a forward direction unto the pickup floor. The tripping of control relay CR44 also causes control sections CS30A–D to be re-energized permitting other conveyor units to now approach the elevator. After the conveyor unit has passed out of the elevator, it energizes pulse section PS43 which trips control relay CR43, thereby permitting the contactor coil U2 to again be energized upon the closing of any of relays CR41A–D.

Assume now an extreme case where a conveyor unit on each of the delivery floors simultaneously approaches the return elevator 95 or the equivalent case where a conveyor unit on each floor approaches and is stopped by control sections CS30A–D while another conveyor unit is returning to the pick-up floor. In either of such cases all of the conveyor units may pass through control sections CS30A–D and energize pulse sections PS41A–D causing control relays CR41A–D to all be closed at one time. Under such circumstances the control sections CS30A–D will become de-energized and remain de-energized until all of such conveyor units have been returned to the pickup floor and the elevator will progressively return the conveyor units on each of the floors A, B, C and D in such order. All of the solenoids SOL–A–D will be energized causing all of the positive stops to be moved to their operative positions, but as each conveyor unit passes through the second control section CS31A, etc. and energizes pulse section PS42A, etc., thereupon tripping the control relay CR41A, etc., the corresponding solenoid becomes de-energized permitting the elevator to pass such floor on the following trip.

With all of the control relays CR41A–D closed, the elevator stops first at the "A" floor due to the fact that the depression of any of limit switches LS20A–D will close control relay CR43 interrupting the circuit to the elevator motor contactor coil U2 and limit switch LS20A is the first one to be depressed. The control sections CS30A–D remain de-energized as long as control relay CR42 is energized, which is until control relay CR41D is tripped, and thereafter until control relay CR44 is tripped which is after the last conveyor unit reaches the pickup floor.

In other respects the operation of the return elevator in a case of simultaneous approach of two or more conveyor units is similar to that described above in connection with the case of a single approaching conveyor unit.

After a conveyor unit leaves the elevator 95 on the pickup floor, it passes through a track switch 96 which serves to join the elevator by-pass track with that leading from the elevator. The operation of such track switch, which is normally in alignment with the elevator track, is such as to block the approach of a conveyor unit from either direction while the switch is in motion, while a preceding conveyor unit is passing through, or while the switch is not in a receiving position, as well as to cause the switch to move to the by-pass position upon the approach of a conveyor unit along the by-pass track and return to normal position after such conveyor unit has passed through, giving normal precedence to the first of two conveyor units approaching the switch along different tracks and giving priority to one of two conveyor units simultaneously approaching the switch. Such a track switch with a control circuit therefor is fully described as an "exit track switch" in our co-pending application, Serial No. 666,609, and a detailed description thereof is therefore omitted from the present application.

It will be understood that in the event the number of conveyor units and their speed of operation were such that a single elevator were inadequate to handle them without undue delay, a number of alternative means for providing any required number of additional elevators could readily be developed by adapting the basic control elements disclosed herein. Thus, one additional elevator could be provided in the multiple floor system by merely adding an alternating track switch such as described above in connection with the counterbalanced elevators; or an elevator could be provided for each delivery floor in which case the single elevator first described could be used with a track switch movable to a position leading from a main line to each elevator and the multiple floor selective means would then be adapted to selectively actuate the proper track switch.

While more than one specific embodiment of an automatic pickup and delivery conveyor system incorporating the essential features of our invention has been fully shown and described herein, it will be understood by those skilled in the art that various modifications may be made without departing from the scope of our invention, as set forth in the following claims.

We claim:

1. An automatic pickup and delivery conveyor system wherein individual loads are automatically picked up from a plurality of pickup points on one floor by self-propelled electrically powered conveyor units and selectively delivered thereby to a plurality of delivery points on a plurality of other floors characterized by the movement of said conveyor units in a forward direction on said pickup floor, the movement of said conveyor units in a reverse direction on said delivery floor, a conveyor track passing over each of said pickup points, a conveyor track passing over each of said delivery points, elevator means joining said pickup floor and delivery floor conveyor tracks, said elevator means being provided with a section of conveyor track which by movement of said elevator means may be brought into alignment with each of said conveyor tracks, said conveyor units traveling along said conveyor tracks unto said section of conveyor track and being moved by said elevator means between said floors, a continuous poly-phase power supply carried by conducting members along said conveyor tracks and said section of conveyor track, collecting means carried by each of said conveyor units continuously energized by said conducting members, two of the power phases carried by said conducting members being the reverse on each of said delivery floors of the power phases carried by corresponding conducting members on said pickup floor, and automatic means for causing the power phases carried by said conducting members along said section of conveyor track to be the same as the power phases carried by corresponding conducting members along each of said conveyor tracks when said section of conveyor track is brought into alignment therewith, whereby the electrical power means for driving said conveyor unit may be energized in one direction while said conveyor unit is on said pickup floor and entering said elevator means and may be energized in a reverse direction while leaving said elevator means and traveling on any of said delivery floors.

2. In an automatic conveyor system wherein an individual load may be automatically picked up from a pickup point and delivered to a delivery point, a conveyor track passing over said pickup and delivery points, an electrically powered self-propelled conveyor unit adapted to run along said conveyor track and to pick up said load while traveling in a forward direction and deliver said load while traveling in a reverse direction, electrical power conducting members along said conveyor track, a poly-phase electrical power supply carried by said conducting members, power collecting means on said conveyor unit, a reversible poly-phase electrical motor on said conveyor unit adapted to receive power from said collecting means and to drive said conveyor unit along said conveyor track in a forward or reverse direction depending on the power phase connections, and means for causing said conveyor unit to travel in a forward direction at said pickup point and a reverse direction at said delivery point comprising means for effecting forward and reverse directional control for said conveyor unit through application of forward and reverse power phase in the power supply conducting members along said conveyor track, isolated sections in said power supply conducting members at locations in the system where reversal of conveyor unit direction of travel is required between pickup and delivery operations, means for effecting a reversal of power phase in said isolated sections when said conveyor unit has reached said locations, and means for maintaining a power phase corresponding to forward and reverse travel in the power conducting members adjacent said respective pickup and delivery points during said respective pickup and delivery operations.

3. In an automatic conveyor system wherein individual loads deposited at a plurality of pickup points may be automatically picked up and delivered to a delivery point, a conveyor track passing over said pickup and delivery points, an electrically powered self-propelled conveyor unit adapted to travel along said conveyor track, a hoist mechanism on said conveyor unit capable of being lowered to a position for engaging one of said loads and of being raised to a position for overpassing other loads, electrical power conducting members along said conveyor track, a poly-phase electrical power supply carried by said conducting members, power collecting means on said conveyor unit, a poly-phase electrical motor on said conveyor unit adapted to receive power from said collecting means and to operate said hoist mechanism, a control circuit for causing said motor to operate in a lowering and raising direction, sections of a conducting member adjacent each of said pickup points which may be energized upon depositing a load at said pickup point, and separate collecting means on said conveyor unit adapted to contact said sections in passing, a relay energized upon the energizing of said latter collecting means, said relay having contacts interposed in said control circuit in a manner causing said motor to lower said hoist mechanism when said relay is energized and to raise said hoist mechanism when said relay is de-energized, upper and lower limit means being provided to limit the travel of said hoist mechanism in either direction, and means for preventing said hoist mechanism from being lowered a second time in response to said conveyor unit's approach when loaded to a subsequent load comprising an auxiliary mechanically held relay having a normally closed contact in series with the energizing circuit for said first mentioned relay, said auxiliary relay being closed and its contact opened upon an initial lowering of said hoist mechanism to engage a load.

4. In an automatic conveyor system, as set forth in claim 3, wherein the circuit for closing said auxiliary relay is completed upon the actuation of said lower limit means, means for maintaining the energizing circuit for said first mentioned relay when initially established as long as said separate collecting means remains energized comprising a normally open contact of such relay in parallel circuit with the normally closed contact of said auxiliary relay, said normally open contact being closed when said first mentioned relay is energized, whereby said hoist mechanism after reaching its lower position may remain in such position while engaging a load.

5. In an automatic conveyor system wherein individual loads deposited at a plurality of pickup points may be automatically picked up and delivered to a delivery point, a conveyor track passing over said pickup and delivery points, an electrically powered self-propelled conveyor unit adapted to travel along said conveyor track, a hoist mechanism on said conveyor unit capable of being lowered to a position for engaging one of said loads while said conveyor unit is traveling in a forward direction, of being raised to a position for overpassing other loads and of being lowered to a position for disengaging said load while said conveyor unit is traveling in a reverse direction, electrical power conducting members along said conveyor track, a poly-phase electrical power supply carried by said conducting members, power collecting means on said conveyor unit for contacting each of said conducting members, a poly-phase electrical motor on said conveyor unit adapted to receive power from said collecting means and to drive said conveyor unit along said conveyor track, a poly-phase electrical motor on said conveyor unit adapted to receive power from said collecting means and to operate said hoist mechanism, means for causing said first motor to operate in a forward direction over said pickup points and to reverse its direction prior to the delivery of said load comprising means for effecting forward and reverse directional control for said conveyor unit through application of forward and reverse power phase in the power supply conducting members along said conveyor track, isolated sections in said power supply conducting members at locations in the system where reversal of conveyor unit direction of travel is required between pickup and delivery operations, means for effecting a reversal of power phase in said isolated sections when said conveyor unit has reached said locations, and means for maintaining a power phase corresponding to forward and reverse travel in the power conducting members adjacent said respective pickup and delivery points during said respective pickup and delivery operations, means for controlling the lowering or raising operating directions of said hoist motor characterized by a reversing line contactor, a lowering circuit and a raising circuit for energizing the respective coils of said contactor, and means for causing said circuits to be effective when either forward or reverse power phase is carried in said conducting members.

6. In an automatic conveyor system as set forth in claim 5, a separate control conducting member along said conveyor track normally energized with one of said power phases throughout said conveyor system, separate collecting means on said conveyor unit for contacting said control conducting member, a circuit from said latter collecting means to the collecting means in contact with one of said power conducting members and relay means actuated by such circuit when the current phases carried by such power conducting member and said control conducing member are different although not actuated when such current phases are the same, said relay means being utilized in causing said lowering and raising circuits to be effective when either forward or reverse power phase is carried in said power conducting members by reversing the contactor coils energized by each of such circuits when said reverse power phase is carried in said power conducting members.

7. In an automatic conveyor system, as set forth in claim 3 wherein there is a difference in power phase in the power conducting members adjacent said respective pickup and delivery points, a circuit operative to trip said auxiliary relay when said power collecting means is energized with power phase corresponding to that at said delivery points whereby the establishment of the energizing circuit for said first mentioned relay will not be prevented during delivery operations.

8. In an automatic conveyor system wherein individual loads deposited at at least one pickup point may be automatically picked up and delivered to one of a plurality of delivery points, a conveyor track passing over each of said pickup and delivery points, an electrically powered self-propelled conveyor unit adapted to travel along said conveyor track, a hoist mechanism on said conveyor unit adapted to engage one of said loads at a pickup point and disengage such load at a delivery point, automatic control means for governing the movement of said conveyor unit and the actuation of said hoist mechanism, selective means for identifying each load with respect to its required delivery point, a stepping relay on said conveyor unit, means responsive to said selective means for causing said relay to take a predetermined number of steps upon picking up said load, and means responsive to the number of steps so taken for determining the delivery point at which said conveyor unit will make delivery.

9. In an automatic conveyor system wherein individual loads deposited at at least one pickup point on one floor may each be automatically picked up and selectively delivered to a delivery point on one of a plurality of floors, a conveyor track passing over each of said pickup and delivery points, elevator means joining each floor's conveyor track, an electrically powered sef-propelled conveyor unit adapted to travel along said track and to be moved by said elevator means between said pickup and delivery floors, a hoist mechanism on said conveyor unit adapted to engage one of said loads at a pickup point, automatic control means for governing the movement of said conveyor unit, the actuation of said hoist mechanism and the movement of said elevator, selective means for identifying each load as to its required delivery floor, a stepping relay on said conveyor unit, means responsive to said selective means for causing said relay to take a predetermined number of steps upon picking up said load, and means responsive to the number of steps so taken for determining the delivery floor on which said conveyor unit will make delivery.

10. In an automatic conveyor system wherein individual loads deposited at at least one pickup point on one floor may each be automatically picked up and selectively delivered to one of a plurality of delivery points on one of a plurality of floors, a conveyor track passing over each of said pickup and delivery points, elevator means joining each floor's conveyor track, an electrically powered self-propelled conveyor unit adapted to travel along said track and to be moved by said elevator means between said pickup and delivery floors, a hoist mechanism on said conveyor unit adapted to engage one of said loads at a pickup point, automatic control means for governing the movement of said conveyor unit, the actuation of said hoist mechanism and the movement of said elevator, selective means for identifying each load as to its required delivery floor, selective means for identifying each load as to its required delivery point, two stepping relays on said conveyor unit, means responsive to said selective means for causing each of said stepping relays to take a predetermined number of steps, and means responsive to the number of steps so taken for respectively determining the delivery floor on and delivery pointt at which said conveyor unit will make delivery.

11. In an automatic conveyor system wherein individual loads deposited at at least one pickup point may each be automatically picked up and selectively delivered to one of a plurality of delivery points, a conveyor track passing over each of said pickup and delivery points, an electrically powered self-propelled conveyor unit adapted to travel along said conveyor track, a hoist mechanism on said conveyor unit adapted to engage one of said loads at a pickup point and disengage such load at a delivery point, automatic control means for governing the movement of said conveyor unit and the actuation of said hoist mechanism, selective means for identifying each load with respect to its required delivery point, a stepping relay on said conveyor unit, means responsive to said selective means for causing said relay to take a predetermined number of steps in one direction upon picking up said load, means responsive to the passing of each delivery point for causing said relay to take a step in the opposite direction, and means for causing delivery to be made after a number of said latter steps have been taken corresponding to said number of initial steps.

12. In an automatic conveyor system wherein individual loads deposited at at least one pickup point on one floor may each be automatically picked up and selectively delivered to a delivery point on one of a plurality of floors, a conveyor track passing over each of said pickup and deliverey points, elevator means joining each floor's conveyor track, an electrically powered self-propelled conveyor unit adapted to travel along said track and to be moved by said elevator means between said pickup and delivery floors, a hoist mechanism on said conveyor unit adapted to engage one of said loads at a pickup point, automatic control means for governing the movement of said conveyor unit, the actuation of said hoist mechanism and the movement of said elevator, selective means for identifying each load as to its required delivery floor, a stepping relay on said conveyor unit, means responsive to said selective means for causing said relay to take a predetermined number of steps in one direction upon picking up said load, means associated with said elevator means for causing said relay to step in the opposite direction, and means for determining the deliverey floor on which said conveyor unit will make delivery in response to the taking of a number of said latter steps corresponding to said number of initial steps.

13. In an automatic conveyor system for moving individual loads from at least one pickup point to at least one destination, a conveyor track passing over said pickup point, a plurality of self-propelled conveyor units adapted to travel along said conveyor track, a hoist mechanism on each of said conveyor units capable of being lowered and raised, a hoist motor for lowering and raising said hoist mechanism, electrical conducting means along said conveyor track for carrying an electrical power supply, power collecting means on said conveyor unit, a hoist motor supplied with power from said collecting means for lowering and raising said hoist mechanism, a section of a conducting member along said track and adjacent each pickup point, separate collecting means on said conveyor unit for contacting said section in passing, means for energizing said section upon depositing a load at said pickup point, means responsive to the energizing of said separate collecting means for causing said hoist motor to lower said hoist mechanism to a load engaging position, means responsive to the de-energizing of said separate collecting means for causing said hoist motor to raise said hoist mechanism, and automatic means responsive to the passing of said hoist mechanism in lowered position for de-energizing said section.

14. In an automatic conveyor system for moving individual loads from at least one pickup point to at least one destination, a conveyor track passing over said pickup point, a plurality of self-propelled conveyor units adapted to travel along said conveyor track, a hoist mechanism on each of said conveyor units capable of being lowered and raised, a hoist motor for lowering and raising said hoist mechanism, electrical conducting means along said conveyor track for carrying an electrical power supply, power collecting means on said conveyor unit, a hoist motor supplied with power from said collecting means for lowering and raising said hoist mechanism, a section of a conducting member along said track and adjacent each of said pickup points, separate collecting means on said conveyor unit for contacting said section in passing, a loading mechanism at said pickup point having one position for having a load deposited thereon and another position for having said load automatically picked up therefrom by the lowered hoist mechanism of a passing conveyor unit, means responsive to the progressive movement of said loading mechanism to said first and second mentioned positions for energizing said section, means responsive to the energizing of said separate collecting means for causing said hoist motor to lower said hoist mechanism to a load engaging position, means responsive to the de-energizing of said separate collecting means for causing said hoist motor to raise said hoist mechanism, and automatic means responsive to the passing of said hoist mechanism in lowered position for de-energizing said section.

15. In an automatic conveyor system, as set forth in claim 13, wherein said loads are required to be delivered to one or the other of two delivery points, selective means at said pickup point for causing said section to be energized with one or the other of two alternating current phases, and means responsive to such different current phases for determining the delivery point at which delivery will be made.

16. In an automatic conveyor system, as set forth in claim 13, wherein each load is required to be delivered to one of a plurality of delivery points, a plurality of insulated sections of a conducting member adjacent said first mentioned section, additional separate collecting means on said conveyor unit for contacting each of said plurality of insulated sections while said first mentioned collecting means is contacting said first mentioned section, selective means for causing a predetermined number of said insulated sections to be energized while said hoist mechanism is passing in lowered position, a stepping relay on said conveyor unit, means actuated upon the contact of said additional collecting means with each of said energized sections for causing said stepping relay to move one step, and means responsive to the number of steps so taken for determining the delivery point at which said conveyor unit will make delivery.

17. In an automatic conveyor system, as set forth in claim 13, wherein each load is required to be delivered on one of a plurality of delivery floors and elevator means are provided for moving said conveyor unit between floors, a plurality of insulated sections of a conducting member adjacent said first mentioned section, additional separate collecting means on said conveyor unit for contacting each of said plurality of insulated sections while said first mentioned collecting means is contacting said first mentioned section, selective means for causing a predetermined number of said insulated sections to be energized while said hoist mechanism is passing in lowered position, a stepping relay on said conveyor unit, means actuated upon the contact of said additional collecting means with each of said energized sections for causing said stepping relay to move one step, and means responsive to the number of steps so taken for determining the delivery floor on which said conveyor unit will make delivery.

18. A conveyor system wherein individual loads may each be selectively delivered to any of a plurality of delivery points comprising one or more self-propelled conveyor units, a conveyor track passing over each of said delivery points for said conveyor units, an electrical control circuit at each of said delivery points and on each of said conveyor units for effecting a delivery operation, said conveyor unit control circuit including a stepping relay energized in response to the passing of each delivery point, a circuit being established for initiating said delivery operation after said conveyor unit has passed a predeterminable number of said delivery points.

19. A conveyor system, as set forth in claim 18, wherein the means for actuating said stepping relay includes a section of a conducting member adjacent each of said delivery points, collecting means on said conveyor unit adapted to contact said sections in passing, means for energizing said sections, and means responsive to the energizing of said collecting means for energizing said stepping relay.

20. In a conveyor system, as set forth in claim 18, a section of a conducting member adjacent each of said delivery points, and collecting means on said conveyor unit adapted to contact said sections in passing, said circuit for initiating said delivery operation being established through one of said sections, said collecting means and said stepping relay after the latter has been energized said predeterminable number of times.

21. A conveyor system, as set forth in claim 18, wherein the means for actuating said relay and establishing the circuit for initiating said delivery operation include two sections of a conducting member adjacent each of said delivery points, collecting means on said conveyor unit adapted to contact said sections in passing, means for energizing one of said sections adjacent each delivery point, means responsive to the energizing of said collecting means through contact with said energized sections for energizing said stepping relay, said circuit for initiating said delivery operation being established through one of the other of said sections, said collecting means and said stepping relay after the latter has been energized said predeterminable number of times.

22. A conveyor system wherein individual loads may be automatically picked up from at least one pickup point and each selectively delivered to any of a plurality of delivery points comprising at least one self-propelled conveyor unit, a conveyor track passing over each of said pickup and delivery points for said conveyor units, an electrical control circuit at each of said delivery points and on each of said conveyor units for effecting a delivery operation, said conveyor unit control circuit including a stepping relay energized in response to the passing of each delivery point, a circuit being established for initiating said delivery operation after said conveyor unit has passed a predeterminable number of said delivery points, means for identifying a load deposited at a pickup point with respect to its required delivery point, and means responsive to such identifying means for setting said stepping relay during a pickup operation to a position in accordance with the delivery point to which said load is required to be delivered.

23. A conveyor system, as set forth in claim 22, wherein said stepping relay is provided with two energizing circuits for causing said relay to progressively step in either of two directions, said means for identifying a load comprises a plurality of sections of a conducting member adjacent said pickup point and means for energizing one or more of such sections, and wherein said means responsive to such identifying means comprises collecting means on said conveyor unit adapted to contact said sections in passing, the contact of said collecting means with each of said latter energized sections establishing an energizing circuit for causing said relay to progressively step in one direction, said contact with said energized sections adjacent each delivery point establishing the other energizing circuit for causing said relay to progressively step in the other direction.

24. A conveyor system, as set forth in claim 22, wherein said stepping relay is provided with two energizing circuits for causing said relay to progressively step in either of two directions, said means for identifying a load comprises a plurality of sections of a conducting member adjacent said pickup point and means for energizing one or more of such sections, and wherein said means responsive to such identifying means comprises collecting means on said conveyor unit adapted to contact said sections in passing, the contact of said collecting means with each of said latter energized sections establishing an energizing circuit for causing said relay to progressively step in one direction, said contact with said energized sections adjacent each delivery point establishing the other energizing circuit for causing said relay to progressively step in the other direction, said collecting means for contacting said sections adjacent pickup points being the same as the collecting means for contacting said sections adjacent delivery points, said two energizing circuits being in parallel, and means responsive to said pickup operation being interposed in such circuits for preventing the energizing circuit effective at said delivery points from being established during said pickup operation as well as for preventing the energizing circuit effective at said pickup points from being established in passing said delivery points.

25. A conveyor system, as set forth in claim 22, wherein said stepping relay is provided with two energizing circuits for causing said relay to progressively step in either of two directions, said means for identifying a load comprises a plurality of sections of a conducting member adjacent said pickup point and means for energizing one or more of such sections, and wherein said means responsive to such identifying means comprises collecting means on said conveyor unit adapted to contact said sections in passing, the contact of said collecting means with each of said latter energized sections establishing an energizing circuit for causing said relay to progressively step in one direction, said contact with said energized sections adjacent each delivery point establishing the other energizing circuit for causing said relay to progressively step in the other direction, said means for energizing said sections adjacent said pickup points being effective only during a pickup operation and thereby ineffective to energize the stepping relay of a passing loaded conveyor unit.

26. In a conveyor system, as set forth in claim 25, means responsive to said delivery operation for tripping said relay when said relay is closed during a pickup operation.

27. A conveyor system, as set forth in claim 18, wherein the means for actuating said relay and establishing the circuit for initiating said delivery operation include two sections of a conducting member adjacent each of said delivery points, collecting means on said conveyor unit adapted to contact said sections in passing, means for energizing one of said sections adjacent each delivery point, means responsive to the energizing of said collecting means through contact with said energized sections for energizing said stepping relay, said circuit for initiating said delivery operation being established through one of the other of said sections, said collecting means and said stepping relay after the latter has been energized said predeterminable number of times, and wherein means are provided for preventing a repetition of said delivery operation after a load has been delivered comprising a position of said stepping relay beyond that at which the circuit for initiating said delivery operation may be established, said position being reached upon the contact of said collecting means with the energized section next following the point at which the circuit for initiating said delivery operation is established.

28. In a conveyor system wherein individual loads may be automatically picked up from at least one pickup point and selectively delivered to a plurality of delivery points, at least one self-propelled conveyor unit, a conveyor track passing over said pickup and delivery points for said conveyor units, means for identifying a load deposited at a pickup point with respect to its required delivery point comprising a plurality of sections of a conducting member adjacent said pickup point, means for causing a predetermined number of said sections to be energized during a pickup operation, collecting means on each conveyor unit adapted to contact said sections in passing, a stepping relay on said conveyor unit having a movable contact member, a pair of solenoids one of which is adapted to progressively move said contact member one step in a forward direction each time it is energized and the other of which is adapted to progressively move said contact member in a backward direction each time it is energized, a circuit effective to energize said forward solenoid each time said collecting means is energized through contact with one of said energized sections during a pickup operation, two sections of a conducting member adjacent each of said delivery points which are successively contacted by said collecting means in passing, means for energizing one of said sections at each delivery point, a circuit effective to energize said backward solenoid each time said collecting means is energized through contact with one of said latter energized sections, electrically actuated means for initiating a delivery operation in series with each of the other sections adjacent said delivery points, a circuit for actuating said latter means established through the contact of said collecting means with one of said other sections when the contact member of said stepping relay as a result of said forward and backward stepping has reached a particular position.

29. A conveyor system, as set forth in claim 28, wherein the respective circuits associated with said forward and backward solenoids as well as the circuit established by said contact member for initiating a delivery operation are each in parallel with the others having a common connection with said collecting means, means responsive to said pickup operation being effective to prevent the energizing of said backward solenoid during said pickup operation as well as the energizing of said forward solenoid in passing a delivery point, the combined resistance of said backward solenoid and said electrically actuated means for initiating a delivery operation being sufficiently high to prevent either from being actuated upon the contact of said collecting means with one of the second mentioned sections adjacent a delivery point when the contact member of said stepping relay is not in said particular position.

30. In a conveyor system wherein movement of at least one electrically powered self-propelled conveyor unit from one floor level to another is required, an elevator operating between said floors, an elevator motor and automatic control means for moving said elevator between floors, a conveyor track leading to said elevator on one floor and away from said elevator on the other floor, said conveyor units being adapted to travel in a forward direction along said first mentioned track and in a reverse direction along said second mentioned track, conducting means for carrying a poly-phase power supply along each of said tracks, a poly-phase motor and power collecting means on each of said conveyor units adapted to drive said conveyor unit along said tracks, said conducting means on said first mentioned floor level carrying a power phase adapted to operate said motor in a direction for forward travel, said conducting means on said second mentioned floor level carrying a power phase adapted to operate said motor in a direction for reverse travel, a section of conveyor track within said elevator alignable with said track on each floor, conducting means along said section of track for carrying a poly-phase power supply, a reversing line contactor and automatic control means responsive to the movement of said elevator for causing said latter conducting means to carry a power phase corresponding to said forward travel when said elevator is at said first mentioned floor level and to said reverse travel when said elevator is at said second mentioned floor level.

31. In a conveyor system wherein automatic selective movement of at least one self-propelled conveyor unit from one floor level to any of a plurality of others is required, an elevator movable to and from each of said floors, a conveyor track leading to said elevator on said first mentioned floor level, a conveyor track leading away from said elevator on each of the other floors, a section of track within said elevator alignable with said conveyor track on each floor, an elevator motor and automatic control means for moving said elevator from said first mentioned floor to any of said other floors characterized by a circuit for causing said elevator motor to be energized, a plurality of mechanically held relays having normally open contacts interposed in said circuit in parallel, a plurality of switches each of which is actuated in response to the movement of said elevator to a particular one of said other floor levels, each of said switches having a normally closed contact which is opened by the actuation of said switch in series with the normally open contact of one of said relays, and automatic selective means for closing one of said relays in accordance with the floor to which a conveyor unit is required to be moved.

32. In a conveyor system, as set forth in claim 31, a solenoid actuated positive stop at each of said other floor levels, and an energizing circuit for each of said solenoids, a normally open contact of each of said relays being interposed in the energizing circuit for one of said solenoids whereby the closing of said relay will energize said solenoid.

33. A conveyor system, as set forth in claim 31, wherein said automatic selective means comprises a stepping relay on each conveyor unit, a circuit actuated in response to the position of said stepping relay and in response to the approach of said conveyor unit along said track leading to said elevator for selectively closing one of said mechanically held relays, and means for positioning said stepping relay in accordance with the floor level to which a conveyor unit is required to be moved.

34. A conveyor system, as set forth in claim 31, wherein said automatic selective means comprises a plurality of insulated sections of a conducting member along said track leading to said elevator, each of said sections being connected in series with the closing coil of one of said mechanically held relays, collecting means on said conveyor unit adapted to contact progressively each of said sections in passing, a stepping relay on said conveyor unit, means intermediate the contact of said collecting means with each of said sections for energizing said stepping relay causing it thereby to take progressive steps, a circuit for closing one of said mechanically held relays upon the contact of said collecting means with a corresponding section after said stepping relay has stepped to a certain position, and selective means for setting said stepping relay prior to the approach of said conveyor unit to said elevator whereby a predetermined number of said sections will be passed before said relay closing circuit is established, the energizing of said stepping relay next following the establishment of said relay closing circuit causing it to step to a position where no further relay closing circuit may be established.

35. A conveyor system, as set forth in claim 31, wherein said automatic selective means comprises a plurality of insulated sections of a conducting member along said track leading to said elevator, each of said sections being connected in series with the closing coil of one of said mechanically held relays, collecting means on said conveyor unit adapted to contact progressively each of said sections in passing, a stepping relay on said conveyor unit, a plurality of insulated sections intermediate said first-mentioned sections likewise contacted by said collecting means in passing, means for energizing said intermediate sections, a circuit established upon the contact of said collecting means with each of said energized intermediate sections for energizing said stepping relay causing it thereby to take progressive steps, a circuit for closing one of said mechanically held relays upon the contact of said collecting means with a corresponding first-mentioned section after said stepping relay has stepped to a certain position, and selective means for setting said stepping relay prior to the approach of said conveyor unit to said elevator whereby a predetermined number of said first-mentioned sections will be passed before said relay closing circuit is established, the combined resistance of the energizing means for said stepping relay and closing coil for said mechanically held relay being sufficiently high to prevent an effective relay closing or stepping circuit from being established upon the contact of said collecting means with one of said first-mentioned sections when said stepping relay is not in said certain position.

36. In a conveyor system, as set forth in claim 31, a switch actuated in response to the movement of a conveyor unit into said elevator, a normally open contact of said switch interposed in said circuit for causing said elevator motor to be energized in a manner whereby the closing of any of said mechanically held relays in combination with the actuation of said latter switch will cause said elevator motor to start, said elevator motor being stopped in response to the actuation of the switch having a contact in series with the contact of said mechanically held relay.

37. In a conveyor system, as set forth in claim 31, wherein said conveyor units are adapted to travel in a forward direction along said track leading to said elevator and in a reverse direction on said tracks leading away from said elevator, conducting means for carrying a polyphase power supply along each of said tracks, a polyphase motor and power collecting means on each of said conveyor units adapted to drive said conveyor unit along said tracks, said conducting means on said first mentioned floor level carrying a power phase adapted to operate said motor in a direction for forward travel, said conducting means on said other floors carrying a power phase adapted to operate said motor in a direction for reverse travel, conducting means along said section of track within said elevator for carrying a poly-phase power supply, a reversing line contactor, a pair of energizing circuits therefor and automatic control means for causing said latter conducting means to carry a power phase corresponding to said forward travel when a conveyor unit enters said elevator and corresponding to said reverse travel when said elevator reaches said floor to which a conveyor unit is required to be moved, said energizing circuit corresponding to reverse travel having interposed therein in parallel a normally open contact of each of said mechanically held relays and in series with each of said latter contacts a normally open contact of one of said switches whereby the combined closing of one of said relays and actuation of a corresponding switch will close said energizing circuit corresponding to reverse travel.

38. In a conveyor system, as set forth in claim 31, a circuit for causing said elevator motor to operate in a return direction, a relay contact in said circuit which is closed in response to the movement of a conveyor unit out of said elevator onto any of said conveyor tracks leading away from said elevator, a switch actuated in response to the movement of said elevator back to said first-mentioned floor, said switch having a contact in said latter circuit which is opened when said switch is so actuated and closed in response to the movement of said elevator away from said first-mentioned floor.

39. In a conveyor system wherein automatic movement of self-propelled conveyor units from a plurality of floor levels to a single other floor level is required, an elevator movable to and from each of said floors, a conveyor track leading to said elevator on said plurality of floors, a conveyor track leading away from said elevator on said other floor, a section of track within said elevator alignable with said conveyor track on each floor, an elevator motor and automatic control means for moving said elevator from said other floor to any of said plurality of floors in response to the approach of a conveyor unit on said latter floor characterized by a plurality of mechanically held relays each of which is closed in response to the approach of a conveyor unit to said elevator along a particular floor, a circuit for causing said elevator motor to be energized, each of said relays having a normally open contact interposed in said circuit in parallel, an additional mechanically held relay having a normally closed contact interposed in said circuit, a circuit for closing said latter relay and thereby opening said first-mentioned circuit, a plurality of switches each of which is actuated in response to the movement of said elevator to a particular floor, each of said mechanically held relays associated with particular floors having a normally open contact interposed in said last-mentioned circuit in parallel and each of said switches associated with corresponding floors having a normally open contact in series with such relay contact.

40. In a conveyor system, as set forth in claim 39, a solenoid actuated positive stop at each of said plurality of floor levels, each of said solenoids being energized in response to the closing of the mechanically held relay associated with a corresponding floor.

41. In a conveyor system, as set forth in claim 39, a circuit for causing said elevator motor to operate in a reverse direction for moving said elevator to said other floor, a switch actuated in response to a conveyor unit's entering of said elevator and having a contact interposed in said latter circuit which is closed when said switch is so actuated, a switch actuated in response to said elevator's approach to said other floor and having a contact interposed in said latter circuit which is opened when said latter switch is so actuated.

42. In a conveyor system, as set forth in claim 39, means responsive to the closing of a relay associated with one of said floors for stopping any subsequent conveyor unit approaching said elevator on any of said floors, means responsive to the position of said elevator for stopping the approach of any conveyor unit until said elevator is in receiving position for such conveyor unit, and means responsive to the movement of said conveyor unit past said last mentioned stopping point for tripping the relay associated with the floor on which said conveyor unit is traveling.

43. In a conveyor system wherein the movement of at least one self-propelled conveyor unit from one floor level to another is required, a pair of self-counterbalancing elevators operating between said floors and connected in a manner whereby movement of either of said elevators from one floor to the other is accompanied by the opposite movement of the other elevator from the second to the first mentioned floor, a main conveyor track and branch tracks leading therefrom to each of said elevators on one floor, branch tracks leading from said elevators to a main conveyor track on said other floor, a section of track within each of said elevators alignable with one of said branch tracks on each floor, an elevator motor and automatic control means for moving said elevator between floors, said control means including a pair of circuits for causing movement of said elevators in either direction, means responsive to a conveyor unit's movement from one of said first mentioned branch tracks into one of said elevators for closing one of said circuits, means responsive to the movement of said elevators to new floor levels for opening said latter circuit, means responsive to a subsequent conveyor unit's movement from the other of said first mentioned branch tracks into the other of said elevators for closing the other of said circuits, and means responsive to the return of said elevators to their original floor levels for opening said other circuit.

44. In a conveyor system, as set forth in claim 43, an alternating track switch between each of said main tracks and said respective branch tracks, and automatic means responsive to the movement of a conveyor unit through one of said track switches in one position for causing said track switch to move to its other position.

45. In a conveyor system wherein individual loads deposited at one or more pickup points on one floor are automatically picked up by at least one self-propelled conveyor unit and each selectively delivered to one of a plurality of delivery points on one of a plurality of floors, a conveyor track passing over said pickup and delivery points on each floor, elevator means joining said tracks for moving said conveyor units between floors, a pair of "add and subtract" stepping relays on said conveyor unit, one used in connection with floor selection and the other in connection with delivery point selection, two groups of longitudinally spaced insulated sections of a conducting member adjacent each pickup point, separate longitudinally spaced collecting means on said conveyor unit each adapted to contact the sections of one of said groups during a pickup operation, means for causing a predetermined number of the sections in each group to be energized during said pickup operation for the limited time during which one of said collecting means is passing each group, means responsive to the contact of said collecting means with each of said respective energized sections for causing said relays to progressively step in a forward direction, a group of insulated sections of a conducting member adjacent said elevator means adapted to be contacted by said collecting means in passing, means for momentarily energizing each of said latter sections while being contacted by the collecting means associated with said floor selection relay, means responsive to the contact of said latter collecting means with each of said latter energized sections for causing said latter relay to progressively step in a backward direction, means responsive to the number of backward steps so taken in order for said latter relay to reach a certain position for selectively causing said elevator means to move said conveyor unit to a corresponding floor, an insulated section of a conducting member adjacent each of said delivery points adapted to be contacted by said collecting means in passing, means for momentarily energizing each of said last mentioned sections while being contacted by the collecting means associated with said delivery point selection relay, means responsive to the contact of said last mentioned collecting means with each of last mentioned sections for causing said last mentioned relay to progressively step in a backward direction, and means responsive to the number of backward steps so taken in order for said last mentioned relay to reach a certain position for selectively causing a delivery operation to be initiated at a corresponding delivery point.

46. A conveyor system, as set forth in claim 45, wherein said means for energizing said sections adjacent said elevator means and said delivery points comprise an additional collecting means on said conveyor unit spaced longitudinally a different distance from each of said first mentioned collecting means, a group of members adjacent said elevator means, each of which is adapted to be simultaneously contacted by said additional collecting means each time one of said sections adjacent said elevator means is contacted by said collecting means associated with floor selection, means responsive to said contact of each of said members for energizing the corresponding section simultaneously contacted, a member adjacent each of said delivery points adapted to be simultaneously contacted by said additional collecting means each time a section adjacent said delivery point is contacted by said collecting means associated with delivery point selection, and means responsive to said contact of said latter member for energizing said latter section.

47. A conveyor system wherein individual loads may be automatically picked up from a plurality of pickup points comprising a conveyor track passing over each pickup point, at least one self-propelled conveyor unit adapted to travel along said conveyor track, a hoist mechanism on each conveyor unit capable of being lowered to a position for engaging a load deposited at said pickup point, a hoist motor for operating said hoist mechanism, collecting means on said conveyor unit, an electrical conducting member adjacent said pickup point contacted by said collecting means in passing, means for energizing said conducting member, a circuit responsive to the energizing of said collecting means for causing said hoist motor to lower said hoist mechanism, means responsive to the de-energizing of said collecting means for causing said motor to raise said hoist mechanism, and means responsive to the initial lowering of said hoist mechanism for preventing a subsequent energizing of said collecting means from again causing said motor to lower said hoist mechanism.

48. A conveyor system wherein individual loads may be automatically picked up from a plurality of pickup points comprising a conveyor track passing over each pickup point, at least one self-propelled conveyor unit adapted to travel along said conveyor track, a hoist mechanism on each conveyor unit capable of being lowered to a position for engaging a load deposited at said pickup point, a hoist motor for operating said hoist mechanism, collecting means on said conveyor unit, an electrical conducting member adjacent said pickup point contacted by said collecting means in passing, means for energizing said conducting member, a circuit responsive to the energizing of said collecting means for causing said hoist motor to lower said hoist mechanism, means responsive to the de-energizing of said collecting means for causing said motor to raise said hoist mechanism, and means responsive to the initial lowering of said hoist mechanism for preventing a subsequent energizing of said collecting means from again causing said motor to lower said hoist mechanism, said latter means including a mechanically held relay closed in response to said initial lowering, and a relay contact in said circuit, said contact being opened by the closing of said relay.

49. In an automatic pickup and delivery conveyor system wherein individual loads are picked up on one floor and delivered on another, a self-propelled conveyor unit required to travel in a forward direction during the pickup operation and a reverse direction during the delivery operation, and means for automatically controlling the direction of travel of said conveyor unit comprising a conveyor track on said pickup floor, a conveyor track on said delivery floor, an elevator traveling between said pickup and delivery floors having a section of conveyor track alignable respectively with said pickup and delivery floor conveyor tracks, a poly-phase motor for driving said conveyor units, conducting members for carrying a continuous poly-phase power supply along said conveyor tracks, collecting means carried by each of said conveyor units for contacting said conducting members, two of the power phases carried by said conducting members being the reverse on said delivery floor of the power phase carried by corresponding conducting members on said pickup floor, and automatic means for causing the power phases carried by said conducting members along said elevator section of conveyor track to correspond to the floor at which said elevator is located whereby the electrical power means for driving said conveyor unit may be energized in one direction while said conveyor unit is on said pickup floor and entering said elevator means and may be energized in a reverse direction while leaving said elevator means and traveling on said delivery floor.

50. In an automatic pickup and delivery conveyor system, a conveyor track passing over pickup and delivery points, a self-propelled conveyor unit for traveling on said conveyor track required to travel in a forward direction during the pickup operation and a reverse direction during the delivery operation, and means for automatically controlling the direction of travel of said conveyor unit comprising a poly-phase electrical motor for driving said conveyor unit, conducting members along said conveyor track adapted to carry a poly-phase power supply, collecting means on said conveyor unit for contacting said conducting members, insulated sections in two of said conducting members adjacent each of said delivery points, and control means for reversing the power phases in said insulated sections whereby the electrical power means for driving said conveyor unit may be normally energized in one direction and may be energized in reverse direction during the delivery operation.

51. In an automatic pickup and delivery conveyor system, a conveyor track passing over pickup and delivery points, a self-propelled conveyor unit required to travel on said conveyor track in a forward direction during pickup operations and a reverse direction during delivery operations, and automatic means for controlling the direction of travel of said conveyor unit comprising a poly-phase electrical motor for driving said conveyor unit, conducting members along said conveyor track for carrying a poly-phase power supply, collecting members on said conveyor unit for contacting said conducting members, and automatic means for causing said conveyor unit motor to be driven in a forward direction while traveling over said pickup points and in a reverse direction while effecting delivery at said delivery point comprising means for effecting forward and reverse directional control for said conveyor unit through application of forward and reverse power phase in the power supply conducting members along said conveyor track, isolated sections in said power supply conducting members at locations in the system where reversal of conveyor unit direction of travel is required between pickup and delivery operations, means for effecting a reversal of power phase in said isolated sections when said conveyor unit has reached said locations, and means for maintaining a power phase corresponding to forward and reverse travel in the power conducting members adjacent said respective pickup and delivery points during said respective pickup and delivery operations.

No references cited.